United States Patent
Wall et al.

(10) Patent No.: US 10,612,318 B2
(45) Date of Patent: Apr. 7, 2020

(54) INDUCTIVE COUPLER ASSEMBLY FOR DOWNHOLE TRANSMISSION LINE

(71) Applicant: INTELLISERV INTERNATIONAL HOLDING, LTD., Grand Cayman (KY)

(72) Inventors: Darren Wall, Payson, UT (US); Trent Hassell, Pleasant Grove, UT (US); Ted Christiansen, Houston, TX (US); Craig Thorne, Salem, UT (US); Sterling Beck, Genola, UT (US); Anthony L. Collins, Houston, TX (US); Gerald Minerbo, Missouri City, TX (US); Charles Horton, Sugar Land, TX (US)

(73) Assignee: Intelliserv, LLC, Houston, TX (US)

( * ) Notice: Subject to any disclaimer, the term of this patent is extended or adjusted under 35 U.S.C. 154(b) by 167 days.

(21) Appl. No.: 15/027,196

(22) PCT Filed: Oct. 2, 2014

(86) PCT No.: PCT/US2014/058887
§ 371 (c)(1),
(2) Date: Apr. 4, 2016

(87) PCT Pub. No.: WO2015/051165
PCT Pub. Date: Apr. 9, 2015

(65) Prior Publication Data
US 2016/0237760 A1  Aug. 18, 2016

Related U.S. Application Data

(60) Provisional application No. 61/885,921, filed on Oct. 2, 2013.

(51) Int. Cl.
*E21B 17/02* (2006.01)
*E21B 17/00* (2006.01)
(Continued)

(52) U.S. Cl.
CPC .......... *E21B 17/028* (2013.01); *E21B 17/003* (2013.01); *E21B 47/122* (2013.01); *F16L 25/01* (2013.01)

(58) Field of Classification Search
CPC ...... F16L 25/01; E21B 17/028; E21B 47/122; E21B 17/003
See application file for complete search history.

(56) References Cited

U.S. PATENT DOCUMENTS 4,901,069 A  2/1990 Veneruso
6,830,467 B2  12/2004 Hall et al.
(Continued)

OTHER PUBLICATIONS

International Search Report and Written Opinion dated Feb. 20, 2015, for Application No. PCT/US2014/058887.
(Continued)

*Primary Examiner* — D. Andrews
*Assistant Examiner* — Manuel C Portocarrero
(74) *Attorney, Agent, or Firm* — Conley Rose, P.C.

(57) ABSTRACT

Inductive coupler assemblies for controlling the stray magnetic fields of an inductive coupler to reduce the associated losses are disclosed. This results in reduced attenuation (increased efficiency) of the inductive coupler even in the presence of gaps. The assembly includes an inductive coupler having a housing, a biasing element, and a retention mechanism. The assembly further includes a wire surrounded by a ring of flux channel material disposed in the housing. In some embodiments, the retention mechanism is adapted for removal of the inductive coupler from a pipe joint end. The biasing element may be a circumferential spring disposed between the housing and the pipe joint end. The retention mechanism may be a retention snap ring, press fit, or threaded, to removably couple the housing to the pipe joint end.

16 Claims, 16 Drawing Sheets

(51) Int. Cl.
*F16L 25/01* (2006.01)
*E21B 47/12* (2012.01)

(56) References Cited

U.S. PATENT DOCUMENTS

| | | |
|---|---|---|
| 6,968,611 B2 | 11/2005 | Hall et al. |
| 7,040,003 B2 | 5/2006 | Hall et al. |
| 7,098,767 B2 | 8/2006 | Hall et al. |
| 7,248,177 B2 | 7/2007 | Hall et al. |
| 7,319,410 B2 | 1/2008 | Hall et al. |
| 2004/0164838 A1 | 8/2004 | Hall et al. |
| 2004/0221995 A1 | 11/2004 | Hall et al. |
| 2005/0001738 A1 | 1/2005 | Hall et al. |
| 2005/0083064 A1 | 4/2005 | Homan et al. |
| 2005/0150653 A1 | 7/2005 | Hall et al. |
| 2005/0285705 A1 | 12/2005 | Hall et al. |
| 2008/0012569 A1 | 1/2008 | Hall et al. |
| 2010/0248671 A1* | 9/2010 | Yoshino .............. H01Q 1/46 455/272 |
| 2011/0100703 A1 | 5/2011 | Harmon et al. |

OTHER PUBLICATIONS

NOV: "Intelliserv Handbook—Handling and Best Practices," May 14, 2013, XP055373653, Retrieved from the Internet: URL:https://www.nov.com/WorkArea/DownloadAsset.aspx?id=10492, [retrieved on May 17, 2017], pp. 3-5; figures 1,5,6*.
Extended European Search Report dated Oct. 13, 2017, for Application No. 14850564.7.

* cited by examiner

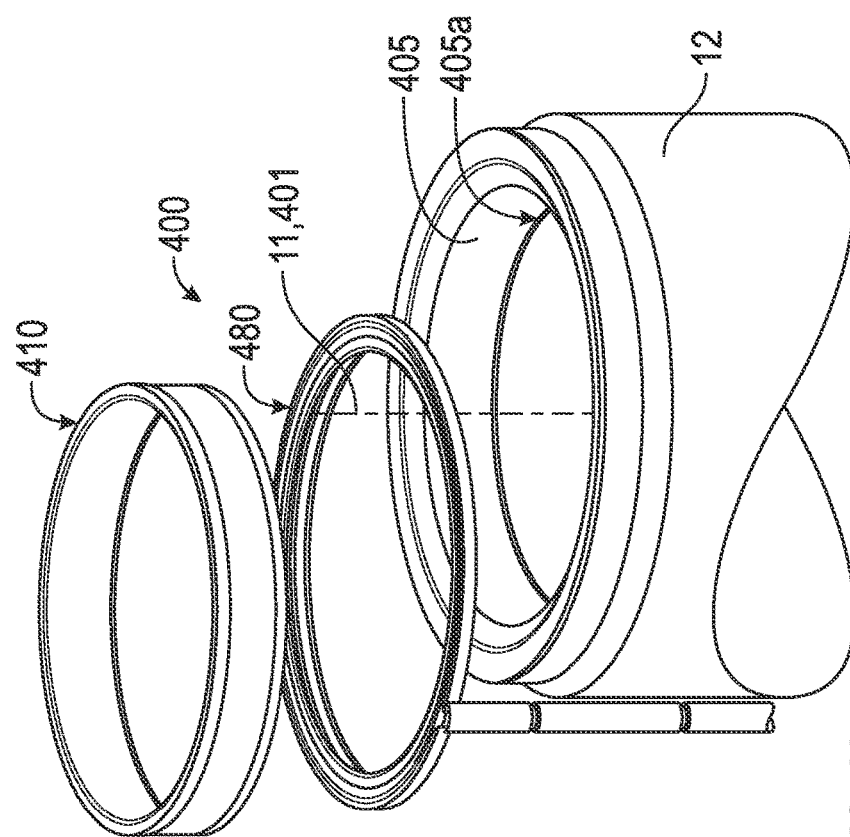
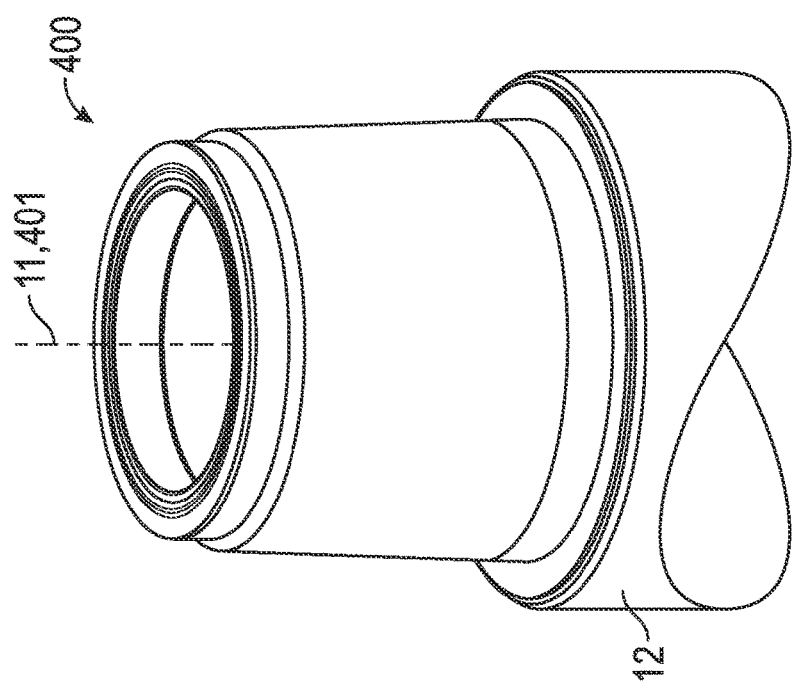
FIG. 12

INDUCTIVE COUPLER ASSEMBLY FOR DOWNHOLE TRANSMISSION LINE

CROSS-REFERENCE TO RELATED APPLICATIONS

The present application is a 35 U.S.C § 371 national stage application of PCT/US2014/058887 filed Oct. 2, 2014, entitled "Inductive Coupler Assembly for Downhole Transmission Line," which claims the benefit of U.S. Provisional Application No. 61/885,921, filed Oct. 2, 2013, entitled "Inductive Coupler Assembly for Downhole Transmission Line," both of which are incorporated herein by reference in their entirety for all purposes.

STATEMENT REGARDING FEDERALLY SPONSORED RESEARCH OR DEVELOPMENT

Not applicable.

BACKGROUND

In downhole drilling operations, downhole measuring tools are used to gather information about geological formations, status of downhole tools, and other downhole conditions. Such data is useful to drilling operators, geologists, engineers, and other personnel located at the surface. This data may be used to adjust drilling parameters, such as drilling direction, penetration speed, and the like, to effectively tap into an oil or gas bearing reservoir. Data may be gathered at various points along the drill string, such as from a bottom-hole assembly or from sensors distributed along the drill string. Once gathered, apparatus and methods are needed to rapidly and reliably transmit the data to the surface. Traditionally, mud pulse telemetry has been used to transmit data to the surface. However, mud pulse telemetry is characterized by a very slow data transmission rate (typically in a range of 1-6 bits/second) and is therefore inadequate for transmitting large quantities of data in real time. Other telemetry systems, such as wired pipe telemetry system and wireless telemetry system, have been or are being developed to achieve a much higher transmission rate than possible with the mud pulse telemetry system.

In wired pipe telemetry systems, inductive couplers or transducers are provided at the ends of wired pipes. The inductive transducers at the opposing ends of each wired pipe are electrically connected by an electrical conductor running along the length of the wired pipe. Data transmission involves transmitting an electrical signal through an electrical conductor in a first wired pipe, converting the electrical signal to a magnetic field upon leaving the first wired pipe using an inductive transducer at an end of the first wired pipe, and converting the magnetic field back into an electrical signal using an inductive transducer at an end of the second wired pipe. Several wired pipes are typically needed for data transmission between the downhole location and the surface.

While downhole, a wired pipe string is subjected to high loads and harsh conditions which can adversely affect the life and function of inductive couplers. In addition, stray magnetic fields may affect inductive transducers by introducing additional inductances to the coupler, which can alter the performance of the coupler. Stray fields can also extend into unsuitable materials and result in increased losses. Stray magnetic fields can produce an increase in attenuation and a decrease in effective bandwidths. Variations in attenuation and bandwidth can cause problems in producing a reliable telemetry rate.

SUMMARY

In one embodiment, an inductive coupler assembly comprises a housing having at least one boss, an overmold disposed around the housing, and a pin having a through bore, the pin disposed in an interior channel of the housing. In addition, the assembly includes a plurality of ferrites disposed in the interior channel of the housing, and a wire disposed in an interior channel of each ferrite. The wire also passes through the through bore of the pin. Moreover, the pin is configured to fit within the boss and prevent rotation of the housing. In some embodiments, the overmold further comprises one or more retention lugs to be removably coupled to a pipe joint end.

In one embodiment, an inductive coupler assembly comprises a housing having a channel, a plurality of bushings coupled to a pipe joint end, and a plurality of pins coupled to the housing. In addition, each pin is coaxial with a bushing, and each bushing receives a pin. In some embodiments, each pin couples to the bushing in a portion of the pipe joint below a surface of a pin end to resist deformation of the pipe joint end. In another embodiment, the retention pins coupled to the housing and in engagement with the retention bushings disposed in the pipe joint end are removable from the retention bushing to remove the housing from the pipe joint end.

In one embodiment, an inductive coupler assembly comprises an inductive coupler having a housing, a biasing element, and a retention mechanism. In addition, the retention mechanism is adapted for removal of the inductive coupler from a pipe joint end. In some embodiments, the assembly further includes a wire surrounded by a ring of flux channel material disposed in the housing.

In one embodiment, an inductive coupler assembly comprises an inductive coupler including a ferrite and a wire, and a shield disposed between the inductive coupler and a pipe joint end. In some embodiments, the shield includes copper.

In one embodiment, a method for reducing losses due to stray fields in an inductive coupler comprises using a cladding or shell material that surrounds a core material of the inductive coupler, and using a material with permeability and conductivity properties that reduces power dissipated as compared to power dissipated of surrounding material. In some embodiments, the method also includes operating the inductive coupler with a gap separating a transmitter section and a receiver section of the coupler.

Embodiments described herein comprise a combination of features and advantages intended to address various shortcomings associated with certain prior devices, systems, and methods. The foregoing has outlined rather broadly the features and technical advantages of the disclosure such that the detailed description of the disclosure that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from the spirit and scope of the disclosure as set forth in the appended claims.

BRIEF DESCRIPTION OF THE DRAWINGS

For a detailed description of the disclosed embodiments, reference will now be made to the accompanying drawings in which:

FIG. 12 is a schematic view of a further embodiment of an inductive coupler assembly for a downhole transmission line in accordance with the principles described herein;

DETAILED DESCRIPTION

Figure 1:
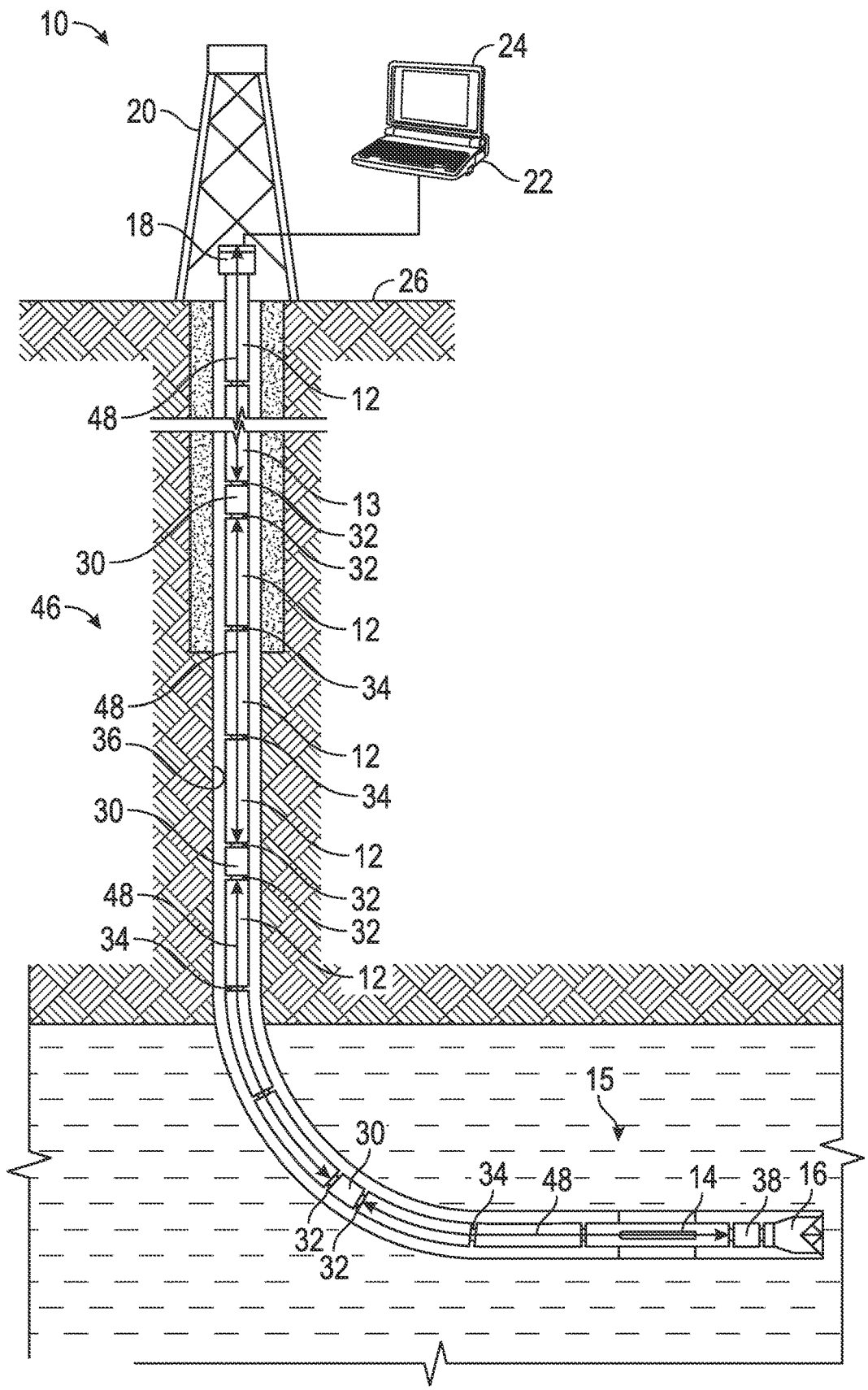
FIG. 1 is a schematic view of a drilling system including an embodiment of a system in accordance with the principles described herein

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosures, including the claims, is limited to that embodiment.

Certain terms are used throughout the following description and claim to refer to particular system components. This document does not intend to distinguish between components that differ in name but not function. Moreover, the drawing figures are not necessarily to scale. Certain features of the disclosure may be shown exaggerated in scale or in somewhat schematic form, and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Still further, reference to "up" or "down" may be made for purposes of description with "up," "upper," "upward," or "above" meaning generally toward or closer to the surface of the earth or the beginning of the drill string as the orientation of the drill string elements relative to the earth's surface changes during horizontal drilling, and with "down," "lower," "lower end," "downward," or "below" meaning generally away or further from the surface of the earth or toward the bit end (i.e., the distal end of the drill string) as the orientation of the drill string elements relative to the earth's surface changes during horizontal drilling.

FIG. 1 illustrates a drilling operation 10 in which a borehole 36 is being drilled through subsurface formation beneath the surface 26. The drilling operation includes a drilling rig 20 and a drill string 13 having central axis 11 (shown in FIG. 2), of coupled tubulars or drill pipe 12 which extends from the rig 20 into the borehole 36. A bottom hole assembly (BHA) 15 is provided at the lower end of the drill string 13. The BHA 15 may include a drill bit or other cutting device 16, a bit sensor package 38, and a directional drilling motor or rotary steerable device 14, as shown in FIG. 1.

The drill string 13 preferably includes a plurality of network nodes 30. The nodes 30 are provided at desired intervals along the drill string. Network nodes essentially function as signal repeaters to regenerate data signals and mitigate signal attenuation as data is transmitted up and down the drill string. The nodes 30 may be integrated into an existing section of drill pipe or a downhole tool along the drill string. Sensor package 38 in the BHA 15 may also include a network node (not shown separately). For purposes of this disclosure, the term "sensors" is understood to comprise sources (to emit/transmit energy/signals), receivers (to receive/detect energy/signals), and transducers (to operate as either source/receiver). Connectors 34 represent drill pipe joint connectors, while the connectors 32 connect a node 30 to an upper and lower drill pipe joint. As is standard in the art, each section of drill pipe 12 has a box joint at one end and a pin joint at the opposite end. Further, each pipe joint has a coupler having a core of magnetic material that transfers signals from one drill pipe 12 to the next. When the pipe joint is made up, the cores transfer the magnetic field from one side to the other. When a coil on one side receives an applied signal, it generates a magnetic field. The core transfers the magnetic field to the other coil which generates an induced signal. One of the factors affecting the efficiency of transfer of the signal is the existence of any stray fields that exist outside of the core magnetic material on each side of the pipe joint and extend out into the pipe. The existence of a gap also introduces stray magnetic fields. These stray magnetic fields contribute to the losses produced in the inductive coupler. These stray magnetic fields can be reduced with careful shaping of the core of the inductive coupler.

This disclosure describes an assembly and a method for controlling the stray magnetic fields of an inductive coupler to reduce the associated losses. This results in reduced attenuation (increased efficiency) of the inductive coupler even in the presence of gaps. The stray magnetic fields that extend outside the inductive coupler and into the surrounding drill pipe result in losses due to induced currents and subsequent resistive heating. The extent at which the fields extend outside the core depends on the material properties of the outside material and the frequency. The depth of penetration is called the skin depth and has the form $$\delta = \sqrt{\frac{2}{\omega \mu \sigma}}$$

where δ is the skin depth, ω is the circular frequency and σ is the conductivity. The amplitude of the electric field is proportional to the magnetic field H by the form $$E = \sqrt{\frac{\omega}{4\pi}} \sqrt{\frac{\mu}{\sigma}} H$$

The electric field can be reduced by having a permeability of 1 and a conductivity as high as possible. Reducing the skin depth can also reduce the amount of resistive heating; for example, with a large permeability and a high conductivity. The electric field in penetrating into the pipe would start with the amplitude of the electric field (E) and decay following the skin depth (δ). The desire is to reduce the power dissipated in the surrounding material. The power density dissipated by this electric field is $$P = \sigma E^2$$

Substituting in equations for the skin depth (δ), the amplitude of the electric field (E), and the power density (P), and multiplying by the volume where the E field decays (Aδ) gives the power dissipated in terms of permeability and conductivity. Combining constants and parameters so that permeability and conductivity are clear gives $$P = C \sqrt{\frac{\omega \mu}{\sigma}} e^{-2x\sqrt{\frac{\omega \mu \sigma}{2}}}$$

The exponential term contains the skin depth. Increasing the permeability reduces the depth penetration and increases the amplitude of the electric field. For materials representing pipe steel, copper, and a magnetic core material (high permeability and conductivity) at 2 MHz, the power dissipated in the pipe is greater than for the copper. Further, the magnetic core material has a high permeability for a small skin depth and a conductivity intermediate to that of the copper and pipe steel. While the high permeability yields a small skin depth, the conductivity is not high enough to compensate for the increased amplitude and so more power is dissipated than the copper.

Referring still to FIG. 1, the nodes 30 comprise a portion of a downhole electromagnetic network 46 that provides an electromagnetic signal path that is used to transmit information along the drill string 13. The downhole network 46 may thus include multiple nodes 30 based along the drill string 13. Communication links 48 may be used to connect the nodes 30 to one another, and may comprise cables or other transmission media integrated directly into sections of the drill string 13. The cable may be routed through the central borehole of the drill string 13, or routed externally to the drill string 13, or mounted within a groove, slot or passageway in the drill string 13. Preferably signals from the plurality of sensors in the sensor package 38 and elsewhere along the drill string 13 are transmitted to the surface 26 through a wire conductor 48 along the drill string 13. Communication links between the nodes 30 may also use wireless connections.

A plurality of packets may be used to transmit information along the nodes 30. Packets may be used to carry data from tools or sensors located downhole to an uphole node 30, or may carry information or data necessary to operate the network 46. Other packets may be used to send control signals from the top node 30 to tools or sensors located at various downhole positions.

Figure 2:
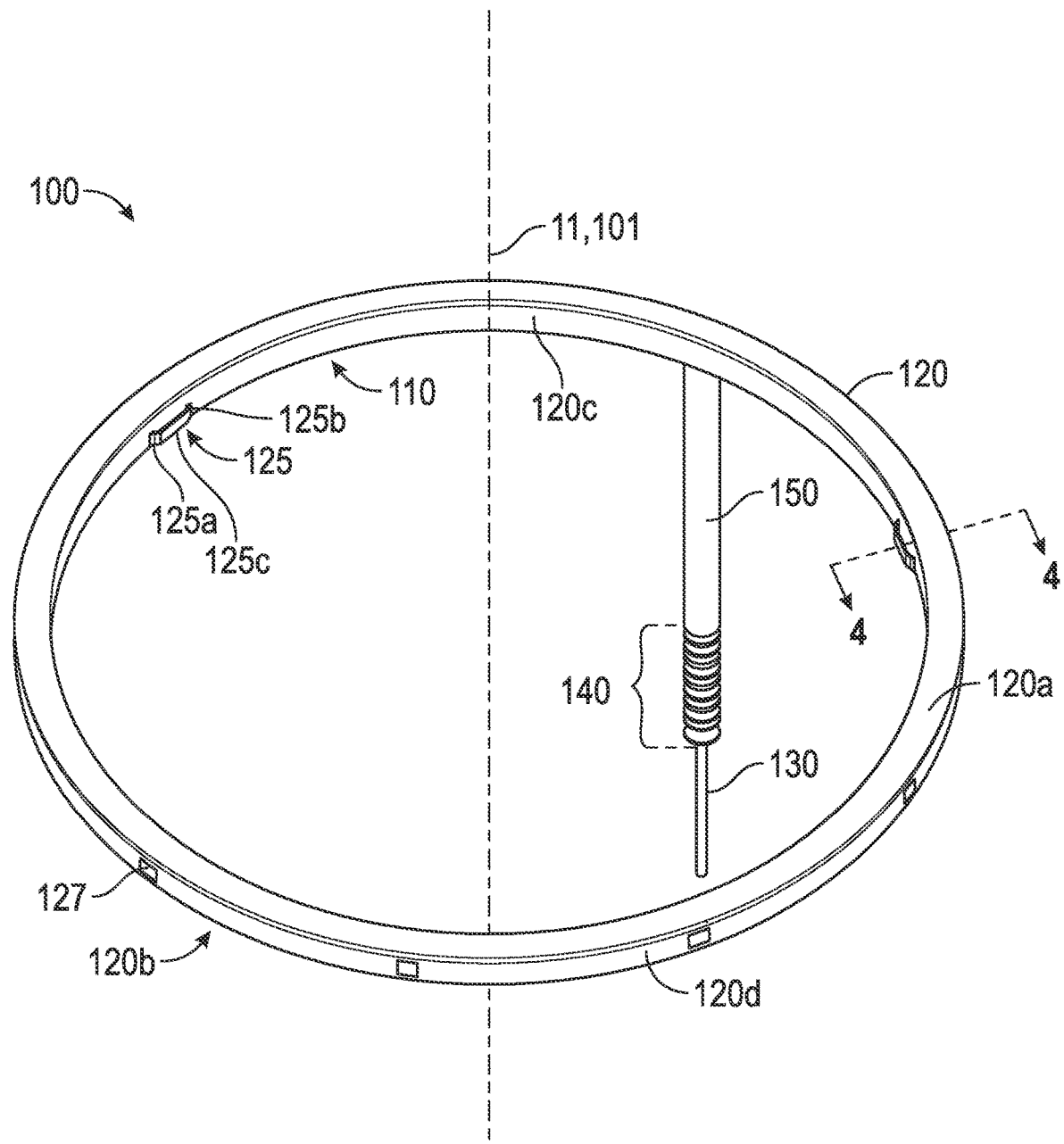
FIG. 2 is a schematic view of an embodiment of an inductive coupler assembly for a downhole transmission line in accordance with the principles described herein.
Figure 3:
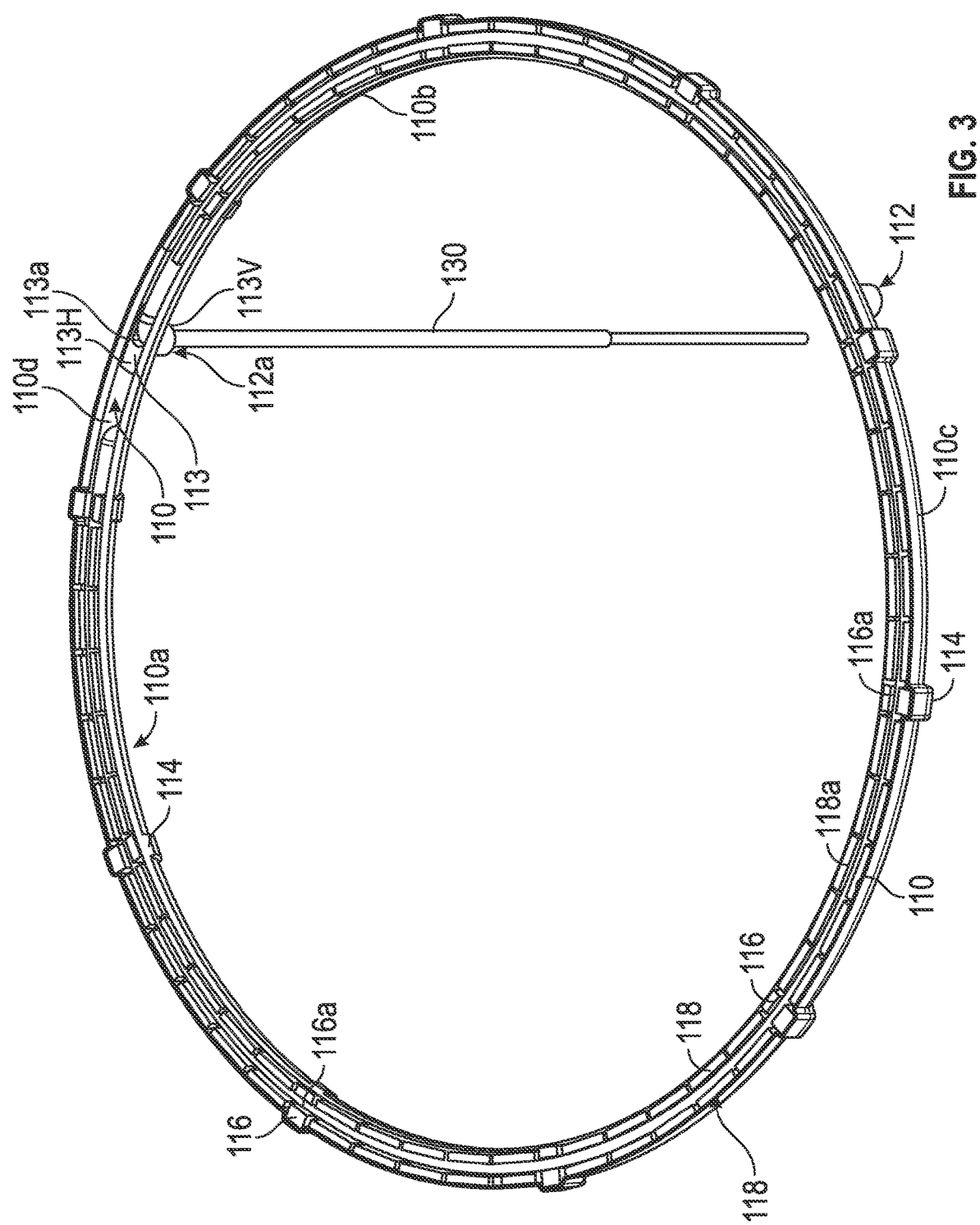
FIG. 3 is a schematic view of a portion of the inductive coupler of FIG. 2.

Referring to FIGS. 1 through 3, a drilling system 10 (FIG. 1) further comprises an embodiment of a removable induction coupler assembly or system 100 (FIG. 2) having a central axis 101 coaxial with drillstring central axis 11. The removable induction coupler system 100 comprises a housing 110 (FIG. 3), an overmold 120 (FIG. 2) having a plurality of retention lugs 125 and openings 127, and a wire 130 having a plurality of coverings and seals 140. Housing 110 is generally cylindrical and has a substantially U-shaped cross section with an exterior underside 110a, an inner side wall 110b, an outer side wall 110c, and an interior channel 110d. Housing 110 may be made of any suitable material known in the art, including but not limited to metals.

Referring to FIG. 3, housing 110 further comprises anti-rotation bosses 112, an anti-rotation pin 113, rectangular protrusions 114, spacers 116, and ferrites 118. Each anti-rotation boss 112 is generally cylindrical, extending axially downward from the exterior underside 110a of the housing 110. Further, the anti-rotation bosses 112 each have a throughbore 112a to allow wire 130 to pass therethrough (however, in most embodiments, wire 130 will pass through only one anti-rotation boss 112). Each anti-rotation boss 112 interfaces with a corresponding bore in the drill pipe 12 to prevent rotation of the coupler system 100. Further, for ease of installation, bosses 112 are spaced equidistantly apart on housing 110, but need not be. In the present embodiment, three anti-rotation bosses are preferably disposed on housing 110 (two shown in FIG. 3); however, in alternative embodiments, housing 110 may comprise one or more anti-rotation bosses 112.

Figure 7:
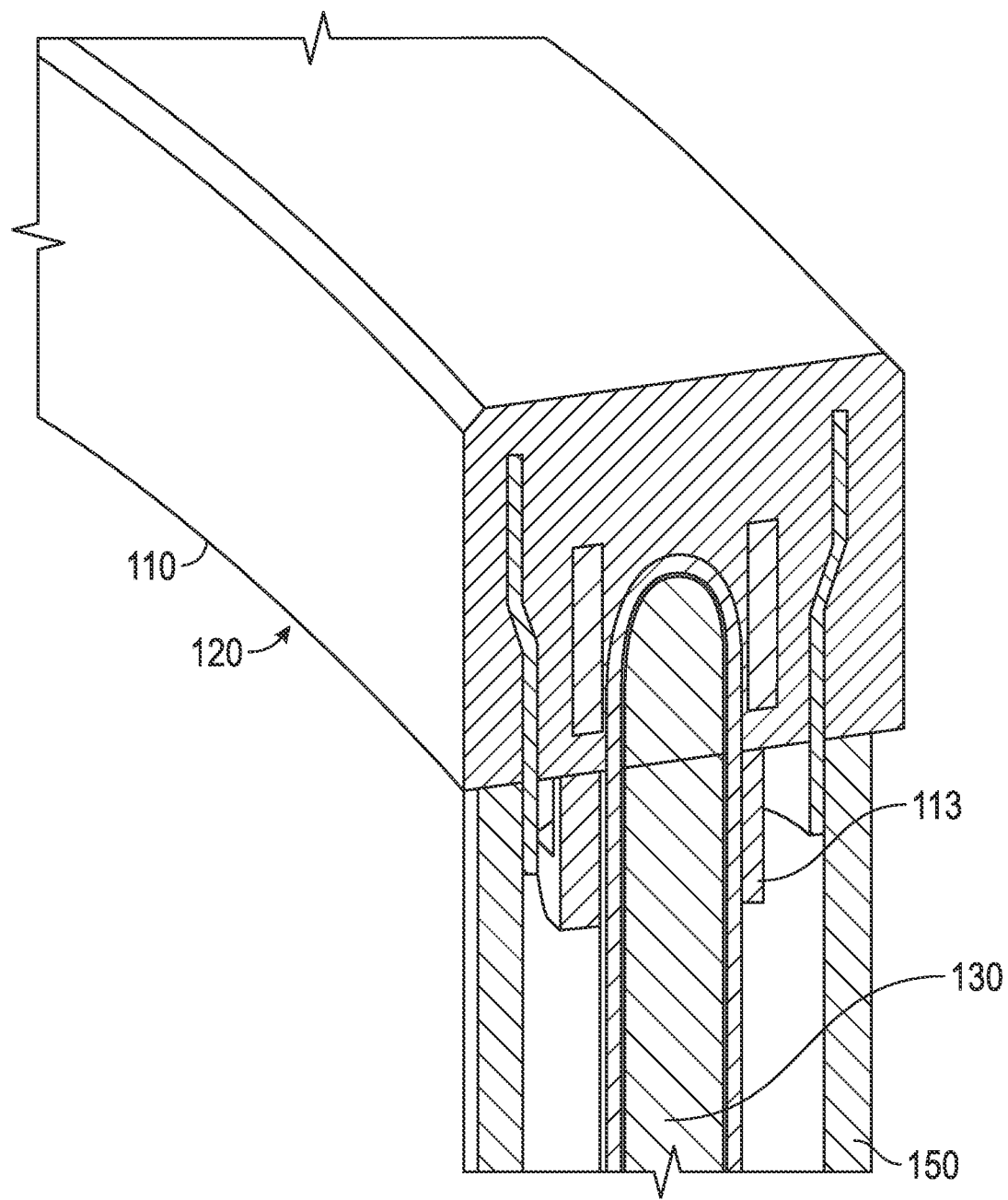
FIG. 7 is an enlarged cross-sectional schematic view at plane 7-7 in FIG. 6.

Anti-rotation pin 113 is generally T-shaped, and comprises a rectangular horizontal portion 113H disposed at the bottom of housing interior channel 110d and a cylindrical vertical portion 113V disposed orthogonal to horizontal portion 113H. The anti-rotation pin 113 further comprises a throughbore 113a that extends axially downward through both the horizontal and vertical portions 113H, 113V, respectively. Further, throughbore 113a is coaxial with throughbore 112a of anti-rotation boss 112 and anti-rotation pin 113 is sized to fit within boss 112, such that pin 113 insulates wire 130 from the housing 110 (shown in FIG. 7) as the wire 130 passes through boss 112.

Referring now to FIG. 3, rectangular protrusions 114 are generally rectangular and each protrusion 114 extends radially inward from housing inner side wall 110b toward central axis 101 and extends radially outward from housing outer side wall 110c. Protrusions 114 are shown in the present embodiment equidistantly and circumferentially spaced about housing 110; however, in other embodiments, protrusions may be unevenly spaced about housing 110. Each protrusion 114 houses a spacer 116, which extends radially from inner side wall 110b to outer side wall 110c and comprises a channel 116a through which wire 130 is disposed.

Ferrites 118 are disposed end-to-end in housing interior channel 110d between spacers 116, such that ferrites 118 are disposed in substantially the entire interior channel 110d. Ferrites 118 may be made of any suitable material containing a magnetic field known in the art, including but not limited to 61 NIZN made by Fair-Rite Corp., Co-Nectic AA made by Magnetic Shield Corp., and Fluxtrol made by Fluxtrol Corp. Similar to the spacers 116, each ferrite 118 comprises a channel 118a through which wire 130 is disposed. Thus, wire 130 passes through and rests in the channel 116a of each spacer 116, passes through and rests in the channel 118a of each ferrite 118, and then passes through the throughbore 113a in anti-rotation pin 113 along with throughbore 112a of anti-rotation boss 112, and on to a coaxial data cable embedded in the tool joint of drill string 12.

Referring now to FIG. 2, overmold 120 completely encases the housing 110 and comprises a top surface 120a opposite a bottom surface 120b, an inner side wall 120c coaxial with an outer side wall 120d, retention lugs 125, and openings 127. Overmold top surface 120a encases the spacers 116, ferrites 118, and wire 130 (shown in FIG. 3). Overmold bottom surface 120b encases the housing exterior underside 110a and comprises an opening for each antirotation boss 112, allowing each boss 112 to extend beyond the overmold bottom surface 120b. Overmold 120 may be made of any suitable material known in the art that may be used in a downhole environment, including but not limited to polymers, and preferably polyether ether ketone (PEEK).

Figure 4:
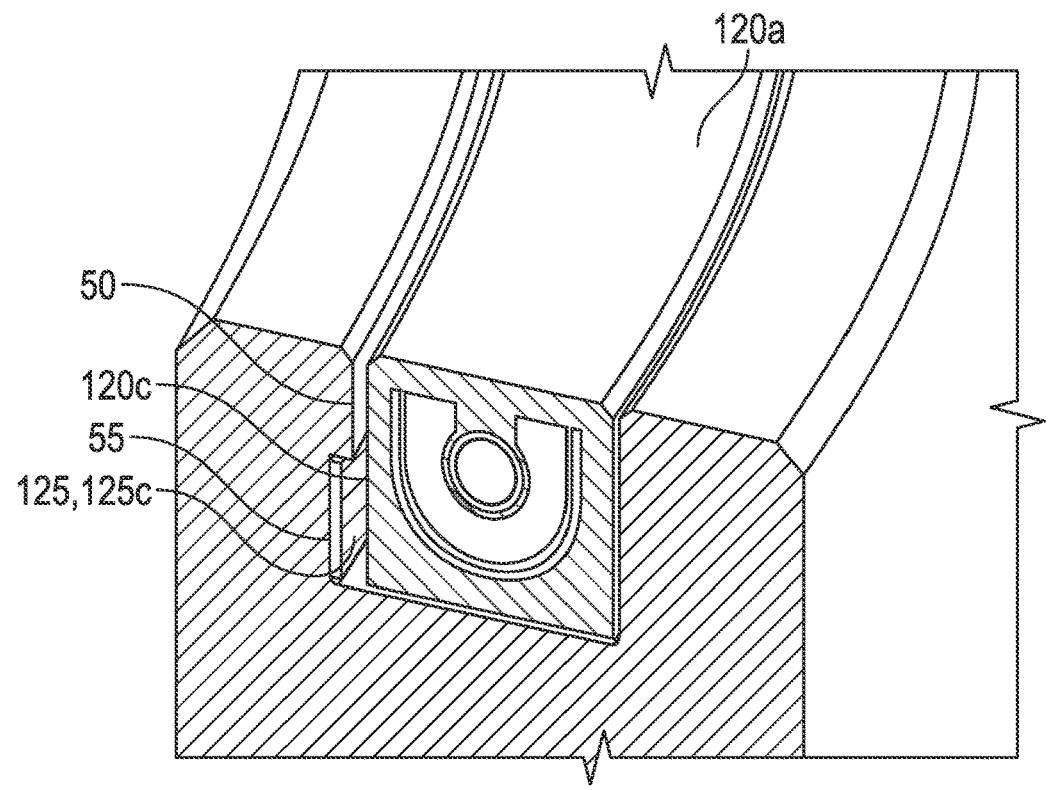
FIG. 4 is an enlarged cross-sectional schematic view at plane 4-4 in FIG. 2.

Referring now to FIGS. 2 and 4, inner side wall 120c further comprises circumferentially and equidistantly-spaced retention lugs 125. Each retention lug 125 comprises a thin strip having end points 125a, 125b attached to inner side wall 120c and a middle portion 125c that protrudes axially inward toward central axis 101. During installation into a drillstring pin end or box end, retention lug middle portion 125c is deformed radially outward toward inner side wall 120c as the retention lug 125 slides by drillstring lip 50, and retention lug 125 pops back out into groove 55 upon clearing lip 50. Thus, removable induction coupler system 100 is retained in the drillstring pin or box end when retention lugs 125 clear lip 50 and expand into groove 55. Retention lugs 125 further act as a centering function during installation into a drillstring component (pin end or box end) and eliminate overtorque damage because lugs 125 absorb any permanent pin nose (radial) deformation. In the present embodiment, retention lugs 125 are spaced equidistantly apart on housing 110, but need not be. Further, in the present embodiment and preferably, three retention lugs 125 are used; however, in alternative embodiments, more retention lugs may be used Referring now to FIGS. 2 and 3, outer side wall 120d further comprises circumferentially and equidistantly-spaced openings 127, which align with circumferentially and equidistantly-spaced protrusions 114. Protrusions 114 may be used to further center the induction coupler system 100 in the drill string 13 component and as a secondary or tertiary grounding path for system 100. Similar to the protrusions 114 shown in the present embodiment to be equidistantly and circumferentially spaced about housing 110, in other embodiments, openings 127 may also be unevenly spaced about overmold outer side wall 120d to correspond to the unevenly spaced locations of the protrusions 114 on housing 110. In yet other embodiments, outer side wall 120d may not have any openings.

Figure 5:
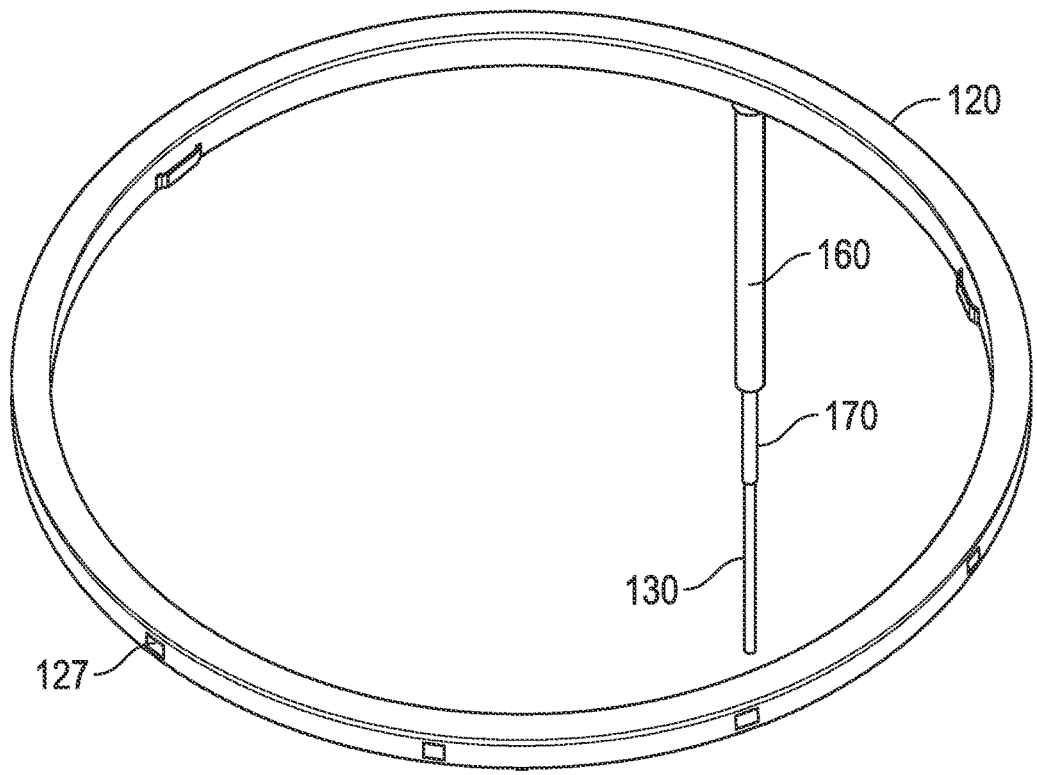
FIG. 5 is a schematic view of a portion of the inductive coupler of FIG. 2.

Referring now to FIGS. 3 and 5, and as previously described, wire 130 passes through and rests in the channel 116a of each spacer 116, passes through and rests in the channel 118a of each ferrite 118, and then passes through the throughbore 113a in anti-rotation pin 113 along with through throughbore 112a of anti-rotation boss 112, and on to a coaxial data cable. Wire 130 has a plurality of coverings and seals 140.

Referring now to FIG. 5, insulation 170 provides a first covering for wire 130. Insulation 170 is substantially cylindrical and disposed on top of and encases wire 130. Insulation 170 extends axially downward from housing exterior underside 110a any suitable distance known in the art. Insulation 170 may be made of any suitable material known in the art, including but not limited to polymers (e.g., PEEK, Teflon).

Referring still to FIG. 5, seal stack spacer 160 is substantially cylindrical and provides a second covering for wire 130 and extends from housing exterior underside 110a axially downward. Seal stack spacer 160 may extend axially downward any suitable distance known in the art, including far enough downward to locate the seal stack 140 (discussed further below) properly in the inner diameter of the armored coax tubing or data cable tubing 180 (see FIG. 8). Seal stack spacer 160 provides seal stack compression by compressing against the armored coax tubing 180 in pipe 12 (see FIG. 8). Seal stack spacer 160 may be made of any suitable material known in the art, including but not limited to polymers (e.g., Teflon, PEEK).

Figure 6:
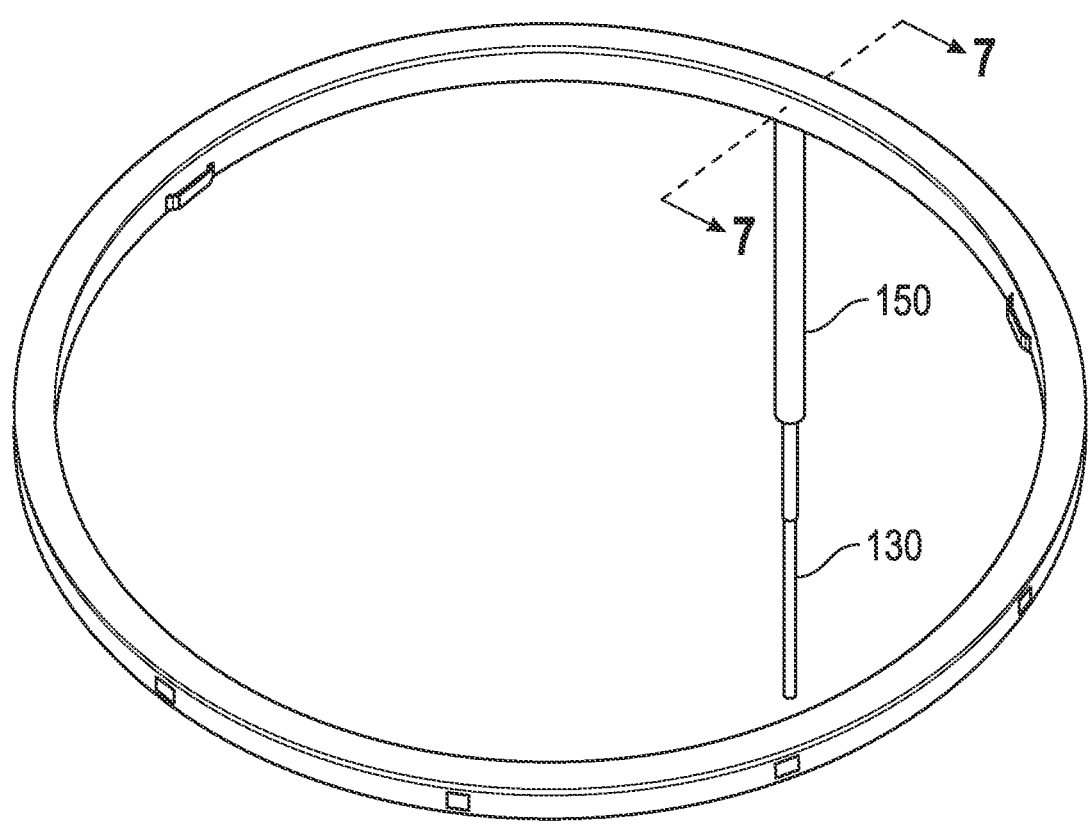
FIG. 6 is a schematic view of a portion of the inductive coupler of FIG. 2.
Figure 8:
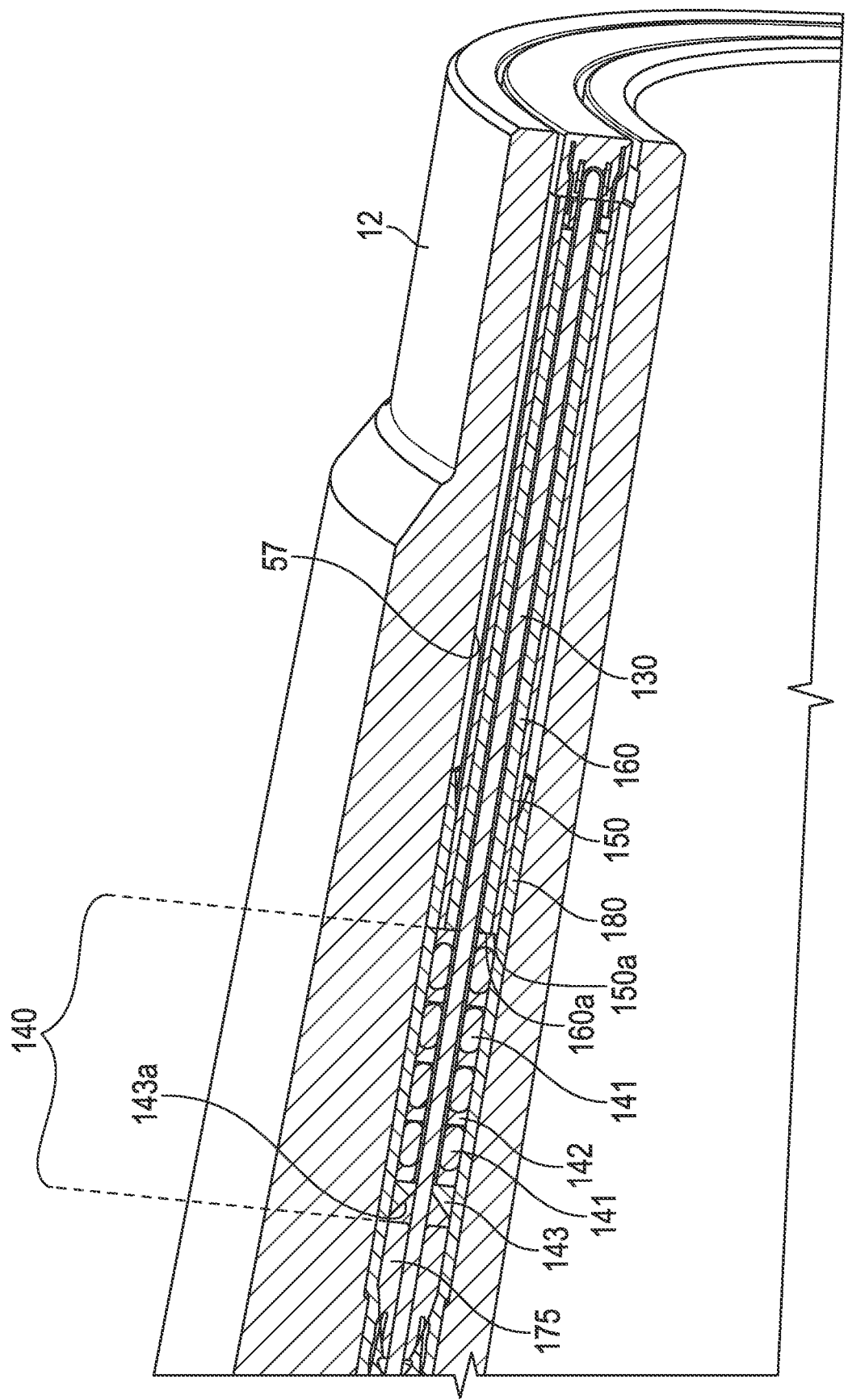
FIG. 8 is an enlarged cross-sectional schematic view of a portion of a system in accordance with the principles disclosed herein.

Referring now to FIGS. 3, 6, and 8, grounding tube 150 provides a third covering for wire 130. Grounding tube 150 is substantially cylindrical and disposed on top of and encases seal stack spacer 160. Grounding tube 150 extends axially downward from housing exterior underside 110a the same distance as the seal stack spacer 160, such that the lower ends 160a, 150a of seal stack spacer 160 and grounding tube 150, respectively, are flush with each other. Grounding tube 150 may be made of any suitable material that will conduct well enough to provide ground from the coupler 100 to the armored coax data cable embedded in tool joint of drill string 12.

Referring now to FIGS. 2 and 8, seal stack 140 provides a fourth covering for wire 130. Seal stack 140 is substantially cylindrical and disposed directly on wire 130 and extends axially downward from the lower ends 160a, 150a of seal stack spacer 160 and grounding tube 150, respectively. Seal stack 140 may extend axially downward any suitable distance known in the art. Seal stack 140 comprises a series of O-rings 141 separated by spacers 142. Seal stack 140 further comprises an angled back up 143, which is a spacer having an angled end 143a, disposed at the lower end of seal stack 140. Seal stack 140 may be made of any suitable material known in the art, including but not limited to polymers.

Seal stack 140 sealingly engages armored coax tubing or data cable tubing 180, which extends above seal stack 140 to also interface with grounding tube 150. Data cable tubing 180 may be made of any suitable material known in the art, including but not limited to metals. The interface between the grounding tube 150 and the data cable tubing 180 provides a robust ground path. In addition, tapered portion 175, disposed below seal stack 140, comprises a tapered end that wedges into the data cable tubing 180 to provide a backup for the seal stack 140. Tapered portion 175 may be made of any suitable material known in the art, including but not limited to ceramics and polymers. For example, tapered portion 175 may be made of ceramic flarel. Further, seal stack 140 and angled back up 154 may be removed and replaced when housing 110 is removed.

Figure 9:
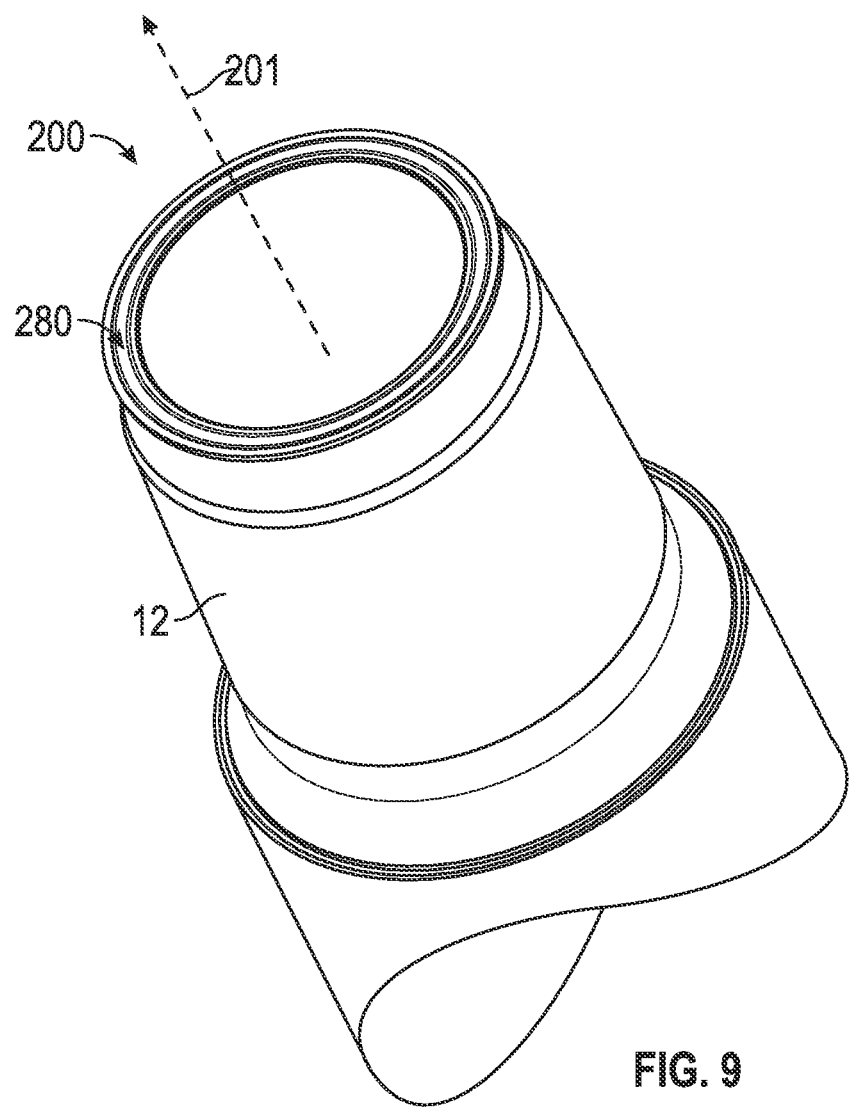
FIG. 9 is a schematic view of another embodiment of an inductive coupler assembly for a downhole transmission line in accordance with the principles described herein.
Figure 10:
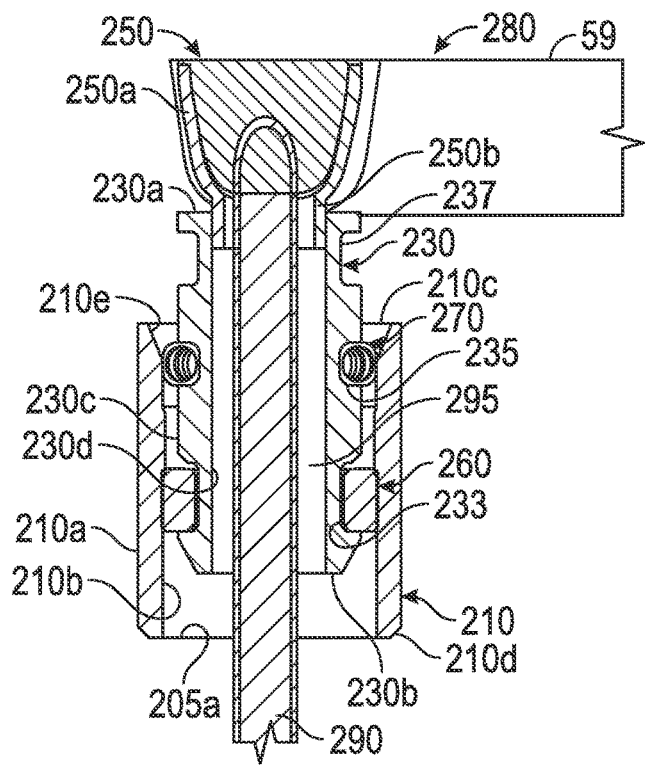
FIG. 10 is an enlarged cross-sectional schematic view of a portion of the inductive coupler of FIG. 9.

Referring to FIGS. 9 and 10, another embodiment of an induction coupler assembly or system 200 is shown having a central axis 201 coaxial with drillstring central axis 11. The removable induction coupler system 200 comprises a retention bushing 210, a retention pin 230 having a plurality of grooves or channels 233, 235, 237, a housing 250, a retention biasing element or spring element 260, an electrical contact 270, a coupler 280, and a wire 290. Retention bushing 210 is tubular and has an outer cylindrical surface 210a coaxial with an inner cylindrical surface 210b, an upper end 210c opposite a lower end 210d, and an upper sloped surface 210e extending from the upper end 210c radially inward and axially downward toward lower end 210d, which results in the upper end 210c having an inner diameter that is greater than the inner diameter of lower end 210d. Bushing 210 is inserted into and press fit in a bore 205 in the drill pipe 12, where the bore 205 has a slightly larger opening than at a shoulder 205a in the bore. The retention bushing 210 receives the retention pin 230, which is attachably connected to the coupler 280 (to be described in more detail below); thus, the retention bushing 210 must be inserted into bore 205 to a precise depth to place the coupler 280 at the proper location. In an alternative embodiment, the features and contours of the retention bushing 210 are machined directly into the pipe 12.

Figure 11:
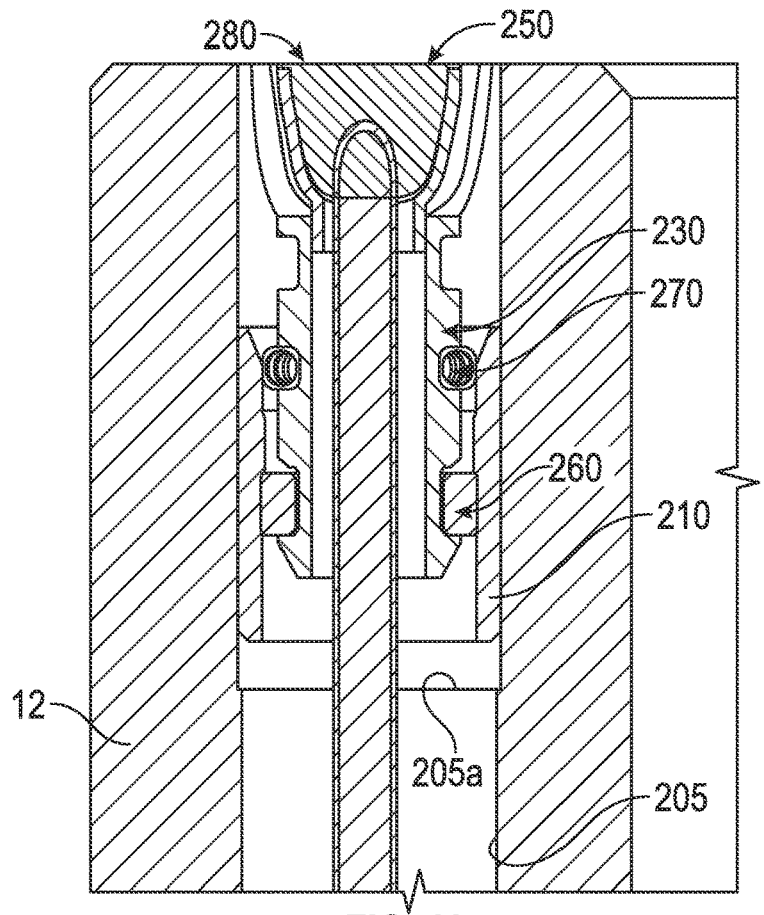
FIG. 11 is an enlarged cross-sectional schematic view of a portion of the inductive coupler of FIG. 9.

In the present embodiment, the shoulder 205a is machined and located at the precise location needed to properly position the coupler 280 and bushing 210 is inserted all the way to the shoulder 205a, such that bushing lower end 210d is in contact with shoulder 205a of the bore. In another embodiment, shown in FIG. 11, the bushing 210 is inserted into bore 205 to a precise depth above shoulder 205a through use of a tool.

Referring now to FIG. 10, retention pin 230 is tubular, coaxial with retention bushing 210, and comprises three external channels or grooves 233, 235, 237. Retention pin 230 has an upper end 230a opposite a lower end 230b and an outer cylindrical surface 230c coaxial with an inner cylindrical surface 230d. Removable induction coupler system 200 preferably has three retention pins 230 circumferentially and equidistantly spaced around housing 250; however, in an alternative embodiment, system 200 may have 2-6 retention pins 230. The three external channels 233, 235, 237 are disposed on outer cylindrical surface 230c. The first or lower channel 233 receives the retention spring element 260 and the second or middle channel 235 receives the electrical contact 270, to be discussed in further detail below. The third or upper channel 237 does not receive any components in the present embodiment. Retention pins 230 may be made of any suitable material known in the art, including but not limited to metals.

Housing 250 for coupler 280 is cylindrical, has an upward-facing channel or U-shaped cross section 250a with two extensions or legs 250b extending axially downward from the bottom of the channel 250a. Housing 250 may be made of any suitable material known in the art, including but not limited to metals. The extensions 250b are welded onto the retention pin inner cylindrical surface 230d near upper end 230a of retention pin 230. Thus, the removal of coupler 280 would also remove the three retention pins 230 welded to the housing 250. In alternative embodiments, the retention pins 230 may be stamped or machined as part of the housing 250.

Referring still to FIG. 10 and as previously discussed, retention biasing element or spring element 260 snaps over and into the first or lower channel 233. Retention spring element 260 may be made of any suitable material known in the art, including but not limited to a spring, elastomer, and a spring loaded portion. Retention spring element 260, for example, could be a square cross-section O-ring.

As previously discussed, electrical contact 270 snaps over and into the second or middle channel 235. Electrical contact 270 may be made of any suitable material known in the art. Electrical contact 270 utilizes the retention pin 230 as part of the grounding path, removing the need to have a grounding tube as in the first embodiment of a removable induction coupler system 100. The ground path would thus go from the coupler 280 to the retention pin 230, out into the pipe 12, and then through the pipe to the data cable (not shown).

After the electrical contact 270 is installed on retention pin 230, the retention pin 230 may be installed in the retention bushing 210 by pushing the retention pin 230 into the center of the retention bushing 210 until both the retention spring element 260 and the electrical contact 270 interface with the retention bushing 210.

Referring still to FIG. 10, wire 290 passes through coupler 280 and exits the housing 250 through a bore between extension legs 250b and disposed on the bottom of housing channel 250a. Wire 290 then passes through insulation 295 disposed along the axial length of inner cylindrical surface 230d of the retention pin 230, such that wire 290 does not directly contact the retention pin 230. Though not shown, the present embodiment uses a seal stack spacer and seal stack similar to the seal stack spacer 116 and seal stack 140 as used in the first embodiment of a removable induction coupler system 100.

By moving the retention pin 230 away from the surface of the secondary shoulder 59 (an area subject to deformation) to below the surface of the pin end, the retention features are in a more stable area of the pipe 12 and subject to less deformation. Further, when the coupler 280 is removed, the retention pin 230, retention spring element 260, electrical contact 270, and the seal stack (not shown) are also removed and may be replaced while reusing the coupler 280.

Figure 13:
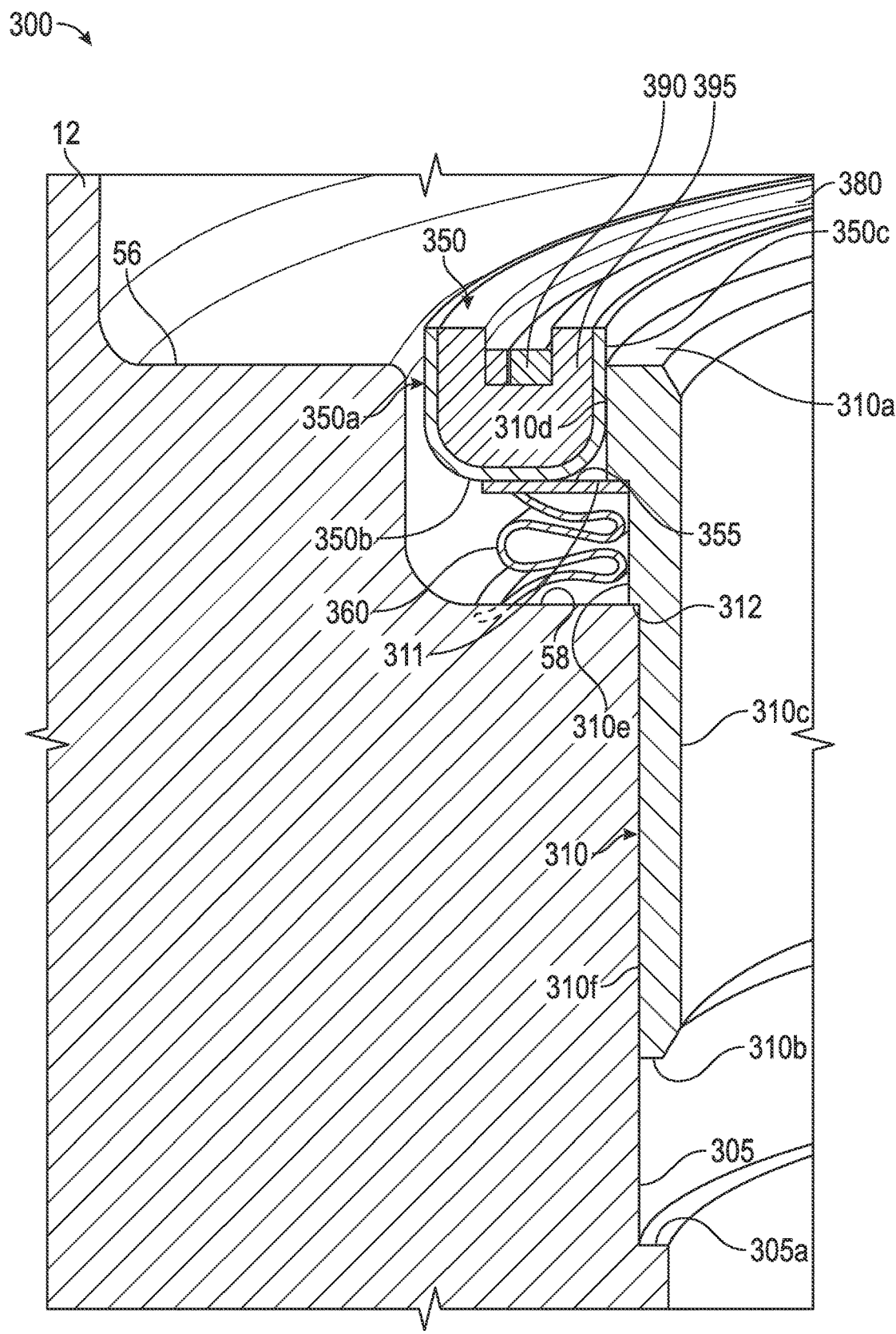
FIG. 13 is an enlarged cross-sectional schematic view of a portion of the box end inductive coupler of FIG. 12.
Figure 14:
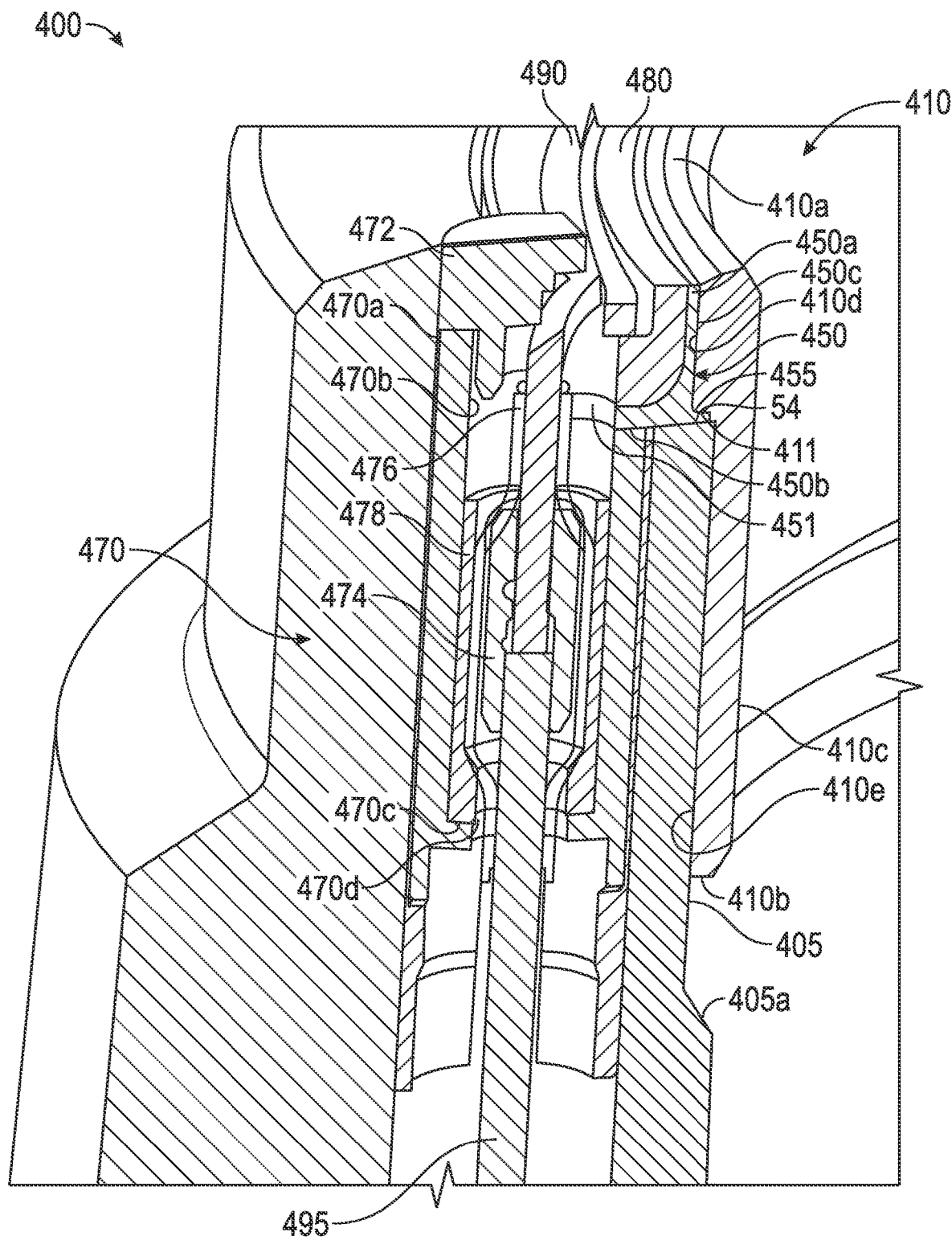
FIG. 14 is an enlarged cross-sectional schematic view of a portion of the pin end inductive coupler of FIG. 12.

Referring to FIGS. 12, 13, and 14, a further embodiment of a removable induction coupler assembly or system comprising a removable box end induction coupler system 300 (FIG. 13) and a removable pin end induction coupler system 400 (FIGS. 12 and 14) is shown having a central axis 301, 401, respectively, each coaxial with drillstring central axis 11. The removable box end induction coupler system 300 shown in FIG. 13 comprises a retention ring 310, a retention biasing element or spring 360, and a coupler 380. Retention ring 310 is cylindrical and has an upper end 310a opposite a lower end 310b; an inner cylindrical surface 310c coaxial with outer cylindrical surfaces 310d (upper), 310e (middle), 310f (lower); an upper lip 311 disposed between the upper and middle outer cylindrical surfaces 310d, 310e, respectively; and a lower lip 312 disposed between the middle and lower outer cylindrical surfaces 310e, 310f, respectively. Retention ring 310 is inserted into and press fit in an inner diameter of a box end of the drill pipe 12, where the bore 305 has a slightly larger opening than at a shoulder 305a in the bore. In alternative embodiments, retention ring 310 may be threaded or have a snap or other retention feature with a corresponding groove in the pipe. Retention ring 310 may be made of any suitable material known in the art, including but not limited to metals.

The removable pin end induction coupler system 400 shown in FIG. 12 comprises a retention ring 410 and a coupler 480, which is nominally configured in a manner that is essentially identical to the box end coupler 380, but which may also have location specific variations. The pin end in the configuration as shown has no spring like the spring 360 (shown in FIG. 13), but a spring could also be optionally added to a pin configuration as needed to meet operational requirements. Retention ring 410 is inserted into and press fit in an inner diameter of a pin end of the drill pipe 12, where the bore 405 has a slightly larger opening than at a shoulder 405a in the bore. When there is no spring, as shown, the configuration of the retention ring 410 would be similar to that of retention ring 310, but without an intermediary lip 312, and the size of the ring would be appropriately correlated to the diameter of pipe bore 405. As with the box end configuration, in alternative embodiments, retention ring 410 may be threaded or have a snap or other retention feature with a corresponding groove in the pipe. Retention ring 410 may be made of any suitable material known in the art, including but not limited to metals.

Spring 360 is a continuous ring that goes around the entire pipe 12 circumference below housing 350 and in a shoulder of pipe 12. Spring 360 allows inductive couplers to be brought into contact with adequate force independent of manufacturing and assembly tolerances or subsequent operational deformations. Spring 360 may be made of any suitable material with elastic properties known in the art including, but not limited to, a metallic spring, elastomer, and a spring loaded portion.

Referring now to FIG. 13, coupler 380 includes a housing 350 having a ledge 355 and a wire 390. Housing 350 is cylindrical, has an upward-facing channel or U-shaped cross section 350a with a bottom face 350b and a side wall 350c. Housing 350 further comprises a ledge or flat ring 355 that is coupled to the bottom face 350b of the housing 350 and extends radially inward past side wall 350c, creating a ledge or shoulder. Housing 350 may be made of any suitable material known in the art, including but not limited to metals. In the present embodiment, ledge or flat ring 355 is welded to the bottom face 350b of housing. In alternative embodiments, ledge 355 may be machined or manufactured directly on the housing 350.

During installation, spring 360 is placed in box end shoulder 58 before the housing 350 is inserted, followed by the retention ring 310, which locks the spring 360 and housing 350 in place. In an alternative embodiment, the spring 360 may be located under housing 350, such that the spring 360 and housing 350 are installed together as an assembly.

Referring still to FIG. 13, wire 390 may be single would or double wound throughout coupler 380 in housing 350 for the transmittal of signals. Wire 390 may be made of any suitable material having suitable electrical conductivity. Wire 390 is further surrounded by a segmented or solid continuous ring of flux channel material 395 disposed in housing 350; flux channel material 395 may be bonded or adhered to housing 350 or snapped in place with retention pieces. Flux channel material 395 may be made of any suitable electrically non-conductive material having favorable magnetic field permeability properties known in the art including, but not limited to, ferrite and Fluxtrol. Further, wire 390 is buried with a filler (not shown) that covers the entire opening of the housing 350. Filler may be any suitable material known in the art, including but not limited to epoxy and PEEK. The grounding path goes from the termination of the coil wire (not shown) to the shielding of the data cable (not shown). Further, when the coupler 380 is removed, the retention ring 310 is also removed.

Referring to FIG. 14, the removable pin end induction coupler system 400 comprises a retention ring 410, a housing 450 having a ledge 455, an anti-rotation pin 470, a coupler 480, and a wire 490. Retention ring 410 is cylindrical and has an upper end 410a opposite a lower end 410b; an inner cylindrical surface 410c coaxial with outer cylindrical surfaces 410d (upper), 410e (lower); and a lip 411 disposed between the upper and lower outer cylindrical surfaces 410d, 410e, respectively. Retention ring 410 is inserted into and press fit in an inner diameter of a pin end of the drill pipe 12, where the bore 405 has a slightly larger opening than at a shoulder 405a in the bore. In alternative embodiments, retention ring 410 may be threaded or have a snap or other retention feature with a corresponding groove in the pipe. Retention ring 410 may be made of any suitable material known in the art, including but not limited to metals.

Housing 450 for coupler 480 is cylindrical, has an upward-facing channel or U-shaped cross section 450a with a bottom face 450b and a side wall 450c. Housing 450 further comprises a ledge or flat ring 455 that is coupled to the bottom face 450b of the housing 450 and extends radially inward past side wall 450c, creating a ledge or shoulder. Housing 450 may be made of any suitable material known in the art, including but not limited to metals. In the present embodiment, ledge or flat ring 455 is welded to the bottom face 450b of housing. In alternative embodiments, ledge 455 may be machined or manufactured directly on the housing 450. In an embodiment, the couplers 380, 480 for the box end and pin end, respectively, are the same.

During installation, coupler 480 is placed in pin end shoulder 54 before the retention ring 410 is press fit to lock the coupler 480 in place.

Referring now to FIGS. 13 and 14, box end housing 350 extends above shoulder 56 in the box end of pipe 12 an amount equivalent to the amount pin end housing 450 is recessed in the pin end of pipe 12 plus sufficient over-travel to allow for tolerances and operational deformations. The spring 360 under the coupler 380 in the box end of the pipe 12 is partially compressed during coupler installation to ensure sufficient coupler-to-coupler contact force during operation. By placing the pin end housing 450 in a recessed state relative to the secondary shoulder face 54 in the pin end of pipe 12, coupler system 400 is less susceptible to damage during handling.

Referring still to FIG. 14, anti-rotation pin 470 is disposed offset from the housing 450 and extends axially downward from housing 450. Anti-rotation pin 470 is tubular, has an external cylindrical surface 470a coaxial with an internal cylindrical surface 470b, and an internal lip 470c with a throughbore 470d. Anti-rotation pin 470 comprises a plug 472, a connector 474, heat shrink 476, and an insulator 478.

Plug 472 fills in any gap left between the wire 490, housing 450, and the internal cylindrical surface 470b of anti-rotation pin 470. Plug 472 may be made with any suitable material known in the art. In the present embodiment, the wire 490 transitions from a larger diameter to a smaller diameter within the coupler 480. In an alternative embodiment, one continuous wire 490 may be used. Connector 474 holds the thicker wire 495 in contact with the magnet wire 490 and heat shrink 476 further encases connector 474 and a portion of wires 490, 495. Insulator 478 is tubular, disposed on internal lip 470c, and prevents a short from occurring between the connector 474 and the anti-rotation pin 470. Insulator 478 may be made of any suitable material known in the art, including but not limited to a polymer and a ceramic. For example, insulator 478 may be made with PEEK.

Referring still to FIG. 14, wire 490 may be double wound through coupler 480 in housing 450 and surrounded by a solid continuous ring of Flux channel material disposed in housing 450. Wire 490 then exits the housing 450 through a bore 451 disposed on the bottom of housing 450b. Wire 490 then passes through heat shrink 476, connector 474, and insulator 478 before connecting to thicker wire 495. Wire 490 may be made of any suitable material having suitable electrical conductivity. Wire 490 is further surrounded by a segmented or solid continuous ring of flux channel material 480 disposed in housing 450. Flux channel material 480 may be bonded or adhered to housing 450 or snapped in place with retention pieces using any suitable method known in the art. The flux channel material may be made of any suitable electrically non-conductive material having favorable magnetic field permeability properties know in the art including, but not limited to, ferrite or Fluxtrol. The primary grounding path is directly attached to the anti-rotation pin and goes from the termination of the coil wire (not shown) to the shielding of the data cable (not shown). Further, when the retention ring 410 is removed, the coupler 480 is also removed.

Figure 15:
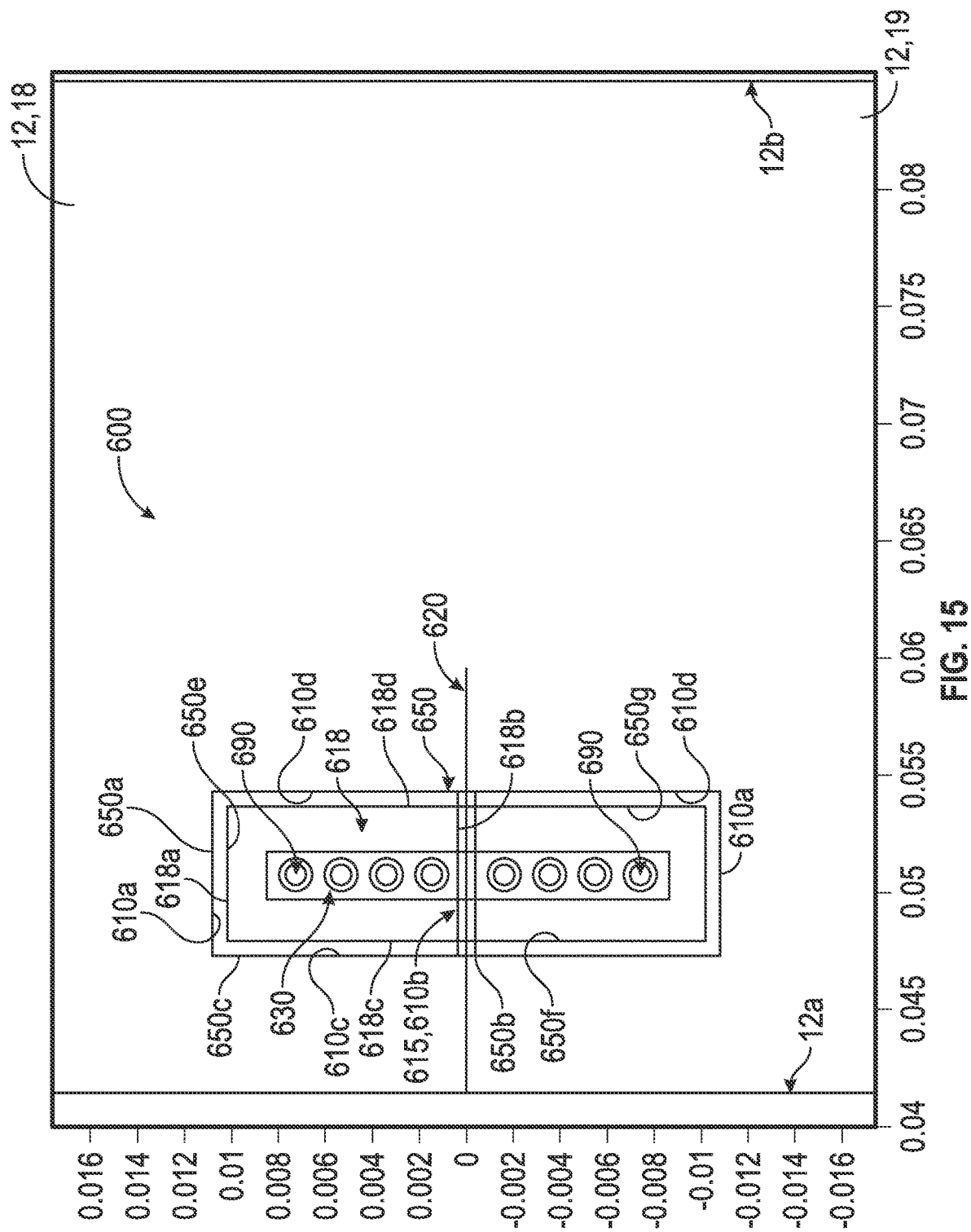
FIG. 15 is a cross-sectional schematic view of an additional embodiment of an inductive coupler assembly for a downhole transmission line in accordance with the principles described herein.

Referring to FIG. 15, an additional embodiment of an induction coupler assembly or system 600 is shown. The induction coupler system 600 is disposed in an annular groove or channel 610 in the face of a joint 620 between two sections of drill pipe 12, the drill pipe having an inner radius 12a and an outer radius 12b. The induction coupler system 600 shown in FIG. 15 is shown at a generic location in a pipe joint; in other embodiments, the location of the induction coupler system 600 may vary. In the present embodiment, one end of the joint 620 is a box end 18 and the other end of joint 620 is a pin end 19 of drill pipe 12. Annular groove 610 has a bottom 610a opposite an opening 610b, an inner side wall 610c, and an outer side wall 610d. System 600 comprises a shell 650, a ferrite ring 618, and a wire 690.

Shell 650 is generally cylindrical and has a substantially U-shaped cross section with an external bottom end 650a opposite a top end 650b; cylindrical external side walls 650c, 650d; an internal bottom surface 650e; and cylindrical internal side walls 650f, 650g. Shell 650 is disposed in annular groove 610 such that shell external bottom 650a is in contact with groove bottom 610a, shell cylindrical external side walls 650c, 650d, are in contact with groove inner and outer side walls 610c, 610d, respectively, and shell top end 650b is aligned with groove opening 610b. Shell 650 may be made of any suitable material having an appropriate permeability and conductivity to reduce the power dissipated compared to the surrounding material (discussed in more detail below). For example, shell 650 may be made of copper or beryllium copper.

Referring still to FIG. 15, ferrite ring 618 is generally cylindrical and has a substantially U-shaped cross section with an external bottom end 618a opposite a top end 618b, an exterior inner side wall 618c, an exterior outer side wall 618d, and an annular channel 630. Ferrite ring 618 is disposed in shell 650, such that ferrite ring external bottom end 618a is in contact with ferrite ring internal bottom surface 650e, ferrite ring exterior inner side wall 618c is in contact with shell interior inner cylindrical surface 650f, ferrite ring exterior outer side wall 618d is in contact with shell interior outer cylindrical surface 650g, and ferrite ring top end 618b is aligned with shell top surface 650b. Ferrite ring 618 may be made of any suitable material standard in the art containing a magnetic field known in the art, including but not limited to 61 NIZN made by Fair-Rite Corp., Co-Nectic AA made by Magnetic Shield Corp., and Fluxtrol made by Fluxtrol Corp.

The wire 690 has four turns in both the box and pin ends 18, 19, respectively, and is disposed in the annular channel 630 of the ferrite ring 618. In other embodiments, the wire 690 may have one or more turns.

In the present embodiment, the groove openings 610b, the shell top surfaces 650b, the ferrite ring top ends 618b, and the ferrite ring annular channels 630 of the box end 18 and pin end 19 are aligned and separated by a gap 615. Gap 615 is preferably between 0.003-0.020 inches, and more preferably approximately 0.005 inches. Further, the induction coupler system 600 is symmetrical about joint 620, but need not be.

Figure 16:
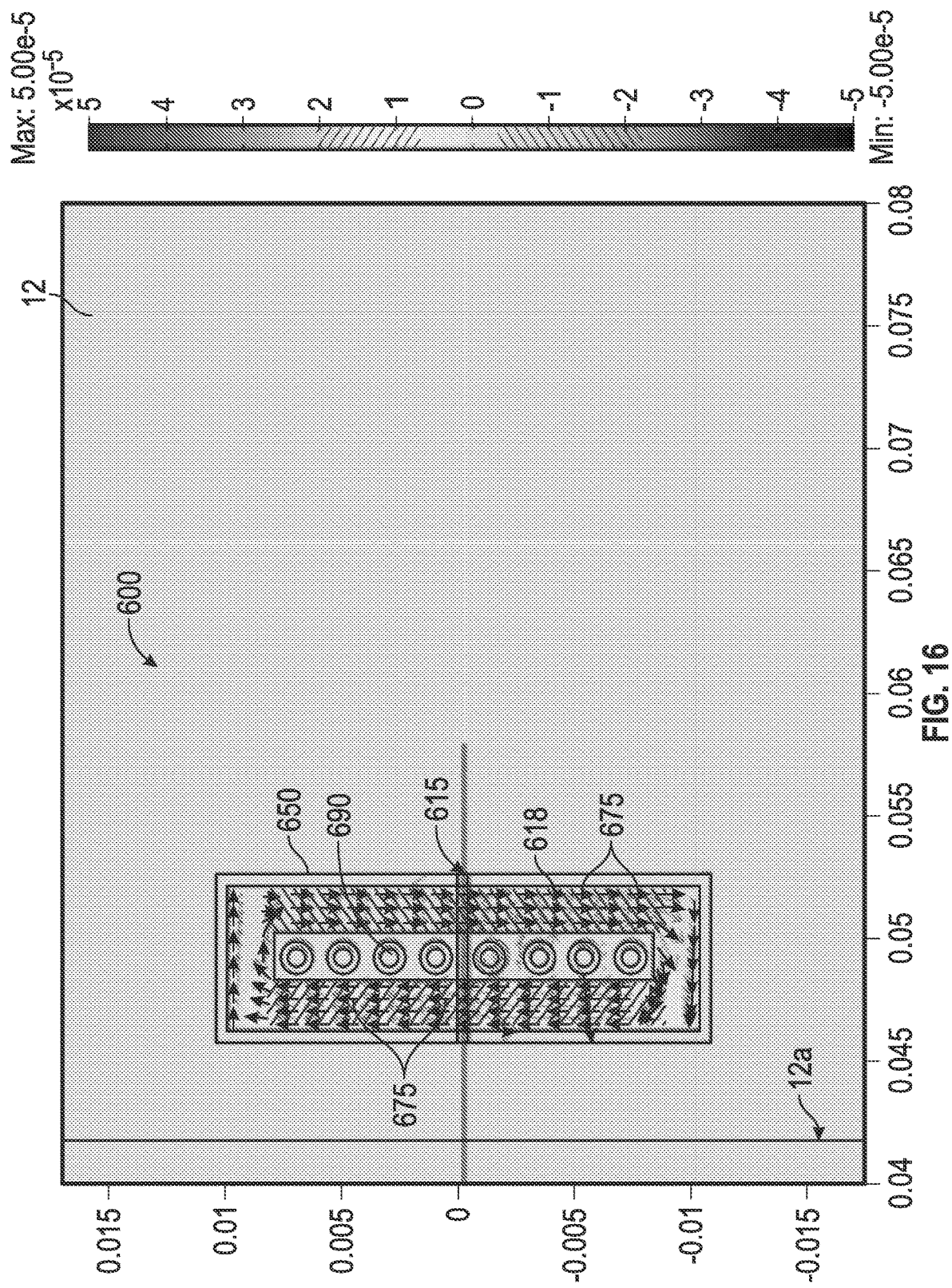
FIG. 16 shows the magnetic flux density of the inductive coupler of FIG. 15.

Referring now to FIG. 16, which shows the magnetic flux density at a frequency of 2 MHz for the in induction coupler system 600 of FIG. 15. Arrows 675 indicate the magnitude and direction of the magnetic flux density, which are primarily contained with shell 650. Shell 650 helps contain the flux and produces a similar pattern of arrows 675 as an induction coupler system 600 that did not have a gap 615 thereby allowing the inductive coupler system 600 to operate in the presence of a gap separating the coiled wire 690 of the box and pin ends 18, 19, respectively, of the drill pipe 12.

Figure 17:
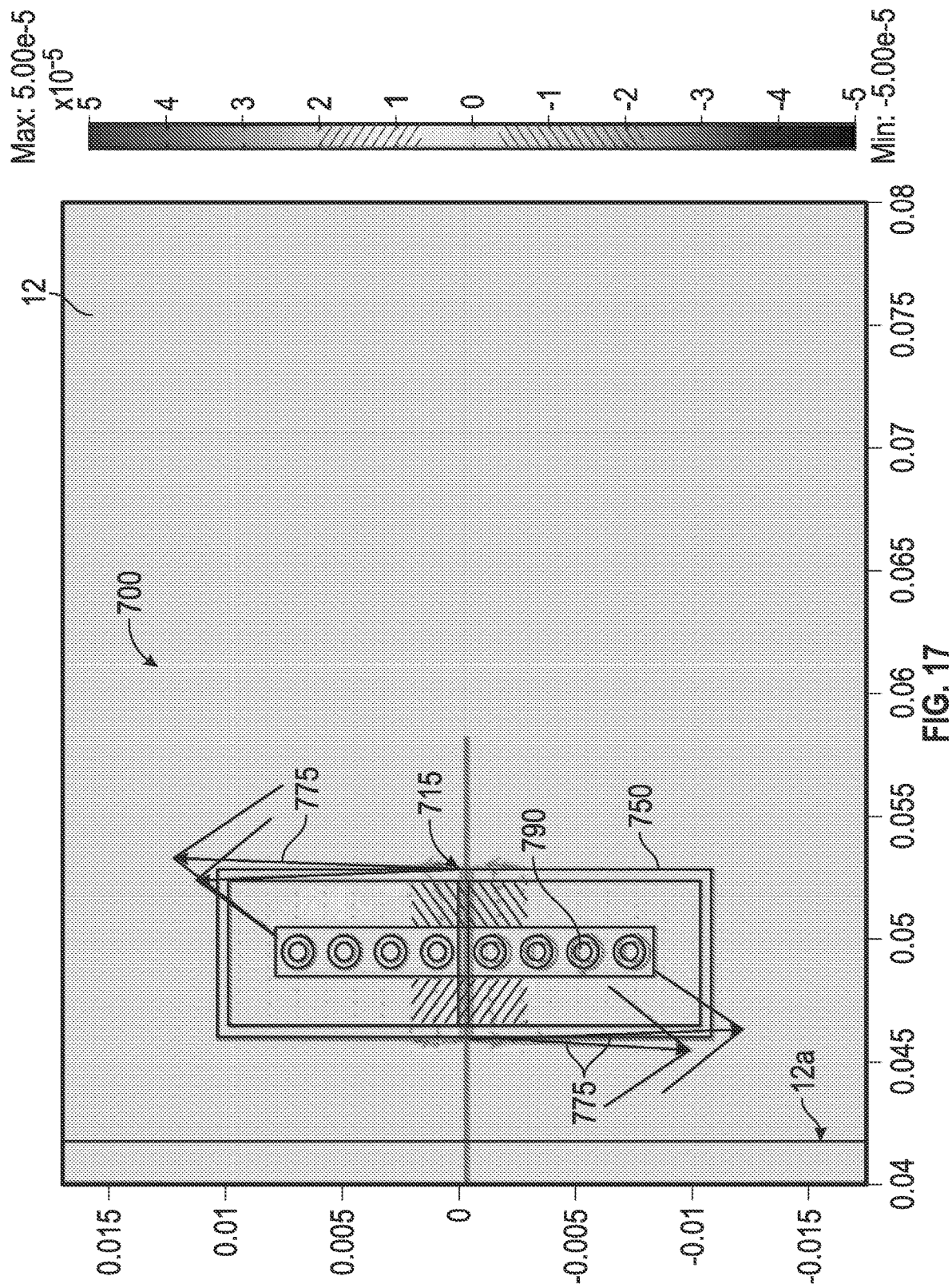
FIG. 17 shows the magnetic flux density of an alternative inductive coupler.

Referring now to FIG. 17, which shows the magnetic flux density at a frequency of 2 MHz for an induction coupler system 700 that comprises a covering 750 having insulative properties, all other components of system 700 are identical to those of system 600 shown in FIG. 16. Like numbers are used to designate like parts. Arrows 775 indicate the magnitude and direction of the magnetic flux density, which leaks out into the drill pipe 12 at gap 715. Thus, a covering 750 with insulative properties does not contain the flux (indicated by arrows 775) within the covering 750 as well as shell 650 of FIG. 16 contains the flux (arrows 675).

Figure 18:
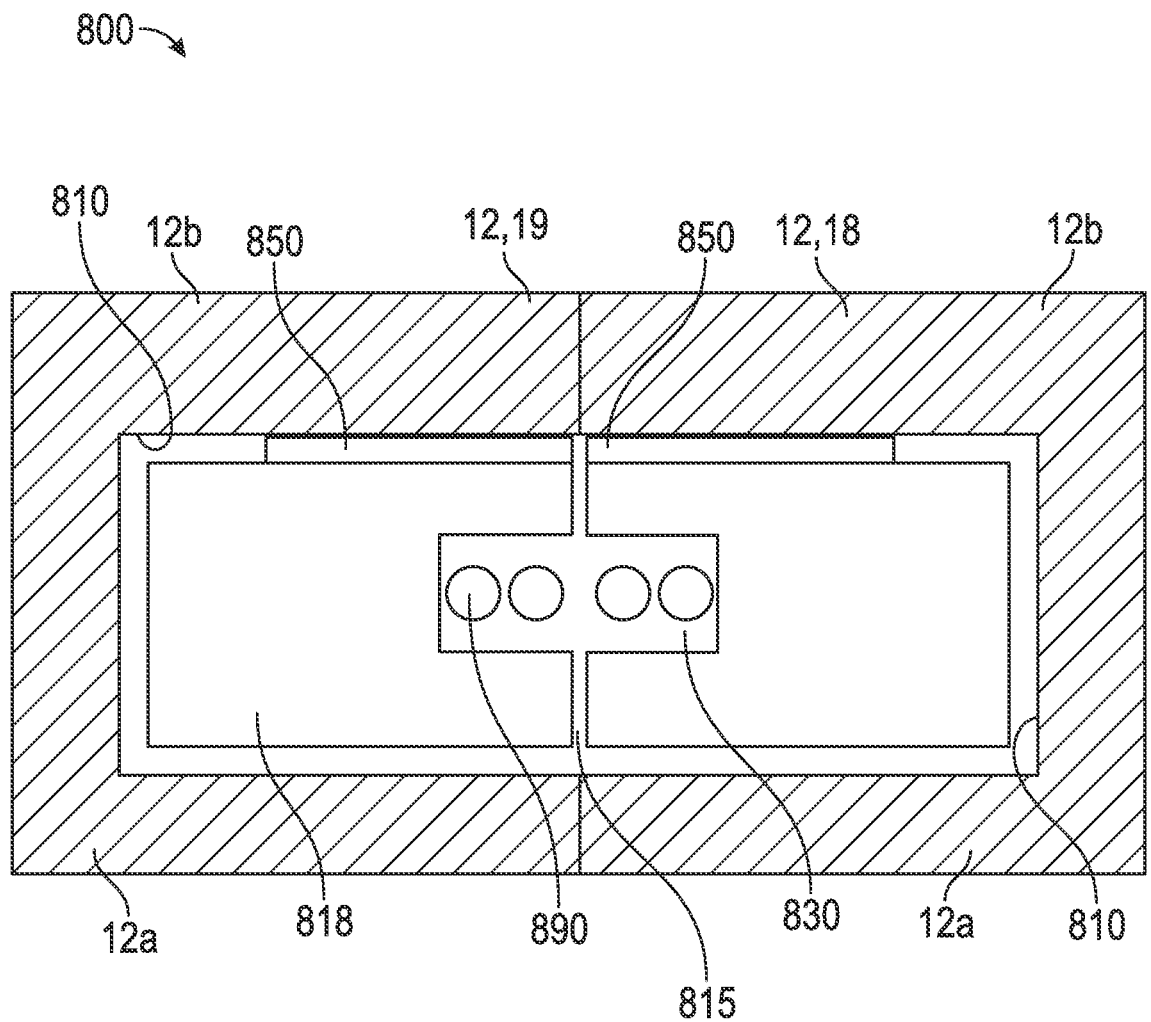
FIG. 18 is a cross-sectional schematic view of an alternative embodiment of the inductive coupler assembly of FIG. 15.

Referring now to FIG. 18, which shows an alternative version 800 of the embodiment of an induction coupler system 600. Induction coupler system 800 comprises a similar ferrite ring 818 having a channel 830, the ferrite ring 818 disposed in an annular groove 810 of drill pipe 12. Wire 890 of system 800 has two turns instead of four as shown in the embodiment of FIG. 15. Similar to the embodiment shown in FIG. 15, system 800 includes a gap 815 between the box end 18 and pin end 19 as well as between the ferrite ring 818, and annular groove 810. Instead of a shell 650, system 800 includes adhesive ring 850 that only covers part of the ferrite ring 818 near the gap 815 and not the whole ring 850. The ring 850 is made of any suitable material having an appropriate permeability and conductivity to reduce the power dissipated compared to the surrounding material. For example, ring 850 may be copper tape. In the present embodiment, ring 850 is adhered to the outer diameter of ferrite ring 818 (side of drill pipe 12 closest to the drill pipe outer radius 12b) and covers approximately 66.7% of the depth of the ferrite ring 818. Further, in the present embodiment, there is no adhesive disposed on the inner diameter of ferrite ring 818 (side of drill pipe 12 closest to the drill pipe inner radius 12a). Even with the partial coverage of the ferrite ring 818 with ring 850, the attenuation is still reduced.

The amount of power dissipated due to stray magnetic fields is reduced by the presence of a shell. Thus, by selecting an appropriate cladding material for the shell 650, the amount of power dissipated due to the stray magnetic fields can be reduced. As previously described, the material used for shell 650 may be any suitable material having an appropriate permeability and conductivity to reduce the power dissipated compared to the surrounding material. For example, shell 650 may be made of copper or beryllium copper.

Exemplary embodiments are described herein, though one having ordinary skill in the art will recognize that the scope of this disclosure is not limited to the embodiments described, but instead by the full scope of the following claims. The claims listed below are supported by the principles described herein, and by the various features illustrated which may be used in desired combinations.

What is claimed is:

1. An inductive coupler assembly comprising:
a housing having at least one boss;
an overmold surrounding an exterior of the housing, the overmold comprising one or more retention lugs positioned on a sidewall of the overmold and removeably insertable into a groove formed in a pipe joint end;
a pin having a through bore, the pin disposed in an interior channel of the housing;
a plurality of ferrites disposed in the interior channel of the housing;
a wire disposed in an interior channel of each ferrite, the wire also passing through the through bore of the pin; and
a seal stack comprising a plurality of annular seals, a plurality of spacers positioned between the seals, and a tapered portion having a first end in engagement with one of the plurality of spacers and a tapered end that wedgingly engages an inner surface of a coaxial tubing that surrounds the wire, wherein the plurality of annular seals are in sealing engagement with an outer surface of the wire and the inner surface of the coaxial tubing;
wherein the pin is configured to fit within the boss and prevent rotation of the housing.

2. The assembly of claim 1, wherein the housing further comprises a plurality of protrusions, each protrusion housing a housing spacer, and each housing spacer comprising a channel through which the wire passes.

3. The assembly of claim 2, wherein each ferrite is disposed end-to-end in the housing interior channel between the housing spacers, wherein the channels of the housing spacers are in alignment with the channels of the ferrites.

4. The assembly of claim 1, wherein the pin insulates the wire from the housing as the wire passes through the boss.

5. The assembly of claim 1, wherein the overmold completely encases the housing.

6. The assembly of claim 1, wherein the wire further comprises a seal extending axially from the housing to be removably coupled to the pipe joint end.

7. An inductive coupler assembly comprising:
a housing having a channel;
a plurality of bushings coupled to a pipe joint end; and
a plurality of pins coupled to the housing, each pin being coaxial with one of the plurality of bushings;
wherein each bushing receives one of the plurality of pins in a bore of the bushing;
wherein a biasing element is positioned radially between each bushing and each pin for coupling the bushing with the pin;
wherein an electrical contact is positioned radially between each bushing and each pin to provide a ground path between the inductive coupler assembly and the pipe joint end, and wherein the electrical contact is axially spaced from the biasing element.

8. The assembly of claim 7, wherein each pin has a plurality of annular grooves on an outer cylindrical surface.

9. The assembly of claim 8, wherein the biasing element is disposed in one of the plurality of annular grooves between the pin and the bushing.

10. The assembly of claim 7, wherein the housing further comprises two protrusions extending axially downward from a bottom of the housing channel.

11. The assembly of claim 10, further comprising a wire passing between the two protrusions.

12. The assembly of claim 11, wherein the wire passes through and is separated from the pin by insulation disposed along an axial length of an inner cylindrical surface of the pin.

13. The assembly of claim 7, wherein each pin couples to the bushing in a portion of the pipe joint below a surface of a pin end to resist deformation of the pipe joint end.

14. The assembly of claim 7, wherein the plurality of pins are removable from the plurality of bushings to remove the housing from the pipe joint end.

15. An inductive coupler assembly comprising:
an inductive coupler including a ferrite and a wire; and
a shield disposed between the inductive coupler and a pipe joint end and configured to contain a magnetic flux from the inductive coupler, wherein the shield is received in a groove extending into an annular surface of the pipe joint end;
wherein the shield comprises a shell having a U-shaped cross-section, and wherein the ferrite and the wire are positioned in the shell;
wherein the shell comprises a top surface and a bottom surface that engages a bottom of the groove, and wherein a gap is formed between the top surface of the shell and the annular surface of the pipe joint end.

16. The assembly of claim 15, wherein the shield includes copper.

* * * * *